US009342930B1

(12) United States Patent
Kraft et al.

(10) Patent No.: US 9,342,930 B1
(45) Date of Patent: May 17, 2016

(54) INFORMATION AGGREGATION FOR RECOGNIZED LOCATIONS

(71) Applicant: A9.com, Inc., Palo Alto, CA (US)

(72) Inventors: Adam Wiggen Kraft, Mountain View, CA (US); Gautam Bhargava, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 458 days.

(21) Appl. No.: 13/750,940

(22) Filed: Jan. 25, 2013

(51) Int. Cl.
| G09G 5/00 | (2006.01) |
| G06K 9/00 | (2006.01) |
| G06K 9/46 | (2006.01) |
| G06K 9/36 | (2006.01) |
| A63F 9/24 | (2006.01) |
| G06T 19/00 | (2011.01) |
| G09G 5/14 | (2006.01) |
| G06T 11/60 | (2006.01) |

(52) U.S. Cl.
CPC .............. G06T 19/006 (2013.01); G06T 11/60 (2013.01); G06T 19/00 (2013.01); G09G 5/14 (2013.01)

(58) Field of Classification Search
CPC ....... G06T 11/60; G06T 19/00; G06T 19/006; G06T 2207/10016; G06T 3/4038; G06T 7/0042; G09G 5/14; G06K 9/18; G06K 9/32; A63F 13/10; A63F 13/08
USPC ................. 345/619, 629–641; 382/103, 182, 382/190–208, 284, 291, 292; 463/30–34
See application file for complete search history.

(56) References Cited

U.S. PATENT DOCUMENTS

| 3,001,439 A | 9/1961 | Rouy |
| 4,876,457 A | 10/1989 | Bose |
| 5,418,864 A | 5/1995 | Murdock et al. |
| 5,611,000 A | 3/1997 | Szeliski et al. |

(Continued)

FOREIGN PATENT DOCUMENTS

| CN | 101010693 A | 8/2007 |
| CN | 101231662 A | 7/2008 |

(Continued)

OTHER PUBLICATIONS

"European Search Report dated Jun. 6, 2013", Europe Application 10744249.3, Jun. 6, 2013, 5 pages.

(Continued)

*Primary Examiner* — Phi Hoang
*Assistant Examiner* — Andrew Shin
(74) *Attorney, Agent, or Firm* — Hogan Lovells US LLP

(57) ABSTRACT

An image or video of a location can be captured using an electronic device. A physical location associated with the image or video can be determined by analyzing the image data, and information about the physical location can be presented to a user of the electronic device. Images or video may include multiple locations, and information about each of the multiple locations can be presented to the user or a single location can be automatically determined and information about the single location can be displayed. Data from other sensors of the electronic device, such as GPS, digital compasses, accelerometers, gyroscopes, barometers, or altimeters, can also be acquired and combined with image analysis to determine a location. The information presented to the user regarding the recognized location may be based on user preferences or user behavior of the specific user of the electronic device, or a community of users who share demographic traits with the specific user.

23 Claims, 11 Drawing Sheets

(56) References Cited

U.S. PATENT DOCUMENTS

| | | |
|---|---|---|
| 5,694,491 A | 12/1997 | Brill et al. |
| 5,694,534 A | 12/1997 | White et al. |
| 5,717,781 A | 2/1998 | Ebel et al. |
| 5,754,978 A | 5/1998 | Perez-Mendez et al. |
| 5,855,000 A | 12/1998 | Waibel et al. |
| 5,974,159 A | 10/1999 | Lubin et al. |
| 5,983,218 A | 11/1999 | Syeda-Mahmood |
| 6,075,905 A | 6/2000 | Herman et al. |
| 6,307,959 B1 | 10/2001 | Mandelbaum et al. |
| 6,446,060 B1 | 9/2002 | Bergman et al. |
| 6,580,811 B2 | 6/2003 | Maurer et al. |
| 6,611,630 B1 | 8/2003 | Miller et al. |
| 6,668,074 B1 | 12/2003 | Wilson |
| 6,671,404 B1 | 12/2003 | Kawatani et al. |
| 6,731,788 B1 | 5/2004 | Agnihotri et al. |
| 6,941,016 B1 | 9/2005 | Wagman et al. |
| 7,003,161 B2 | 2/2006 | Tessadro |
| 7,072,872 B2 | 7/2006 | Caid et al. |
| 7,109,987 B2 | 9/2006 | Goel et al. |
| 7,206,437 B2 | 4/2007 | Kramer et al. |
| 7,240,062 B2 | 7/2007 | Andersen et al. |
| 7,251,637 B1 | 7/2007 | Caid et al. |
| 7,650,035 B2 | 1/2010 | Vincent et al. |
| 7,742,642 B2 | 6/2010 | Goldstein et al. |
| 7,894,689 B2 | 2/2011 | Liu et al. |
| 8,037,043 B2 | 10/2011 | Zoeter et al. |
| 8,126,247 B2 | 2/2012 | Chiang et al. |
| 8,126,272 B2 | 2/2012 | Carr et al. |
| 8,165,401 B2 | 4/2012 | Funayama et al. |
| 8,175,388 B1 | 5/2012 | Fisher |
| 8,184,155 B2 | 5/2012 | Ke |
| 8,214,387 B2 | 7/2012 | King et al. |
| 8,406,507 B2 | 3/2013 | Ruzon et al. |
| 8,644,610 B1 | 2/2014 | Ramkumar et al. |
| 8,699,828 B2 | 4/2014 | Ruzon et al. |
| 8,705,848 B2 | 4/2014 | Ruzon et al. |
| 8,737,737 B1 | 5/2014 | Feldman et al. |
| 8,738,647 B2 | 5/2014 | Menon et al. |
| 8,867,866 B2 | 10/2014 | Ruzon et al. |
| 8,930,134 B2 | 1/2015 | Gu et al. |
| 8,958,629 B2 | 2/2015 | Ruzon et al. |
| 9,043,349 B1 | 5/2015 | Lin et al. |
| 2002/0051575 A1 | 5/2002 | Myers et al. |
| 2002/0181745 A1 | 12/2002 | Hu |
| 2003/0037097 A1 | 2/2003 | Meyer et al. |
| 2003/0208502 A1 | 11/2003 | Lin |
| 2003/0225686 A1 | 12/2003 | Mollett et al. |
| 2004/0057619 A1 | 3/2004 | Lim et al. |
| 2004/0088291 A1 | 5/2004 | Matsuzaki et al. |
| 2005/0002571 A1 | 1/2005 | Hiraga et al. |
| 2005/0060273 A1 | 3/2005 | Andersen et al. |
| 2005/0180632 A1 | 8/2005 | Aradhye et al. |
| 2005/0229200 A1 | 10/2005 | Kirkland et al. |
| 2005/0240407 A1 | 10/2005 | Simske et al. |
| 2005/0271304 A1 | 12/2005 | Retterath et al. |
| 2006/0013450 A1 | 1/2006 | Shan et al. |
| 2006/0045348 A1 | 3/2006 | Kiros et al. |
| 2006/0120629 A1 | 6/2006 | Myers et al. |
| 2006/0212856 A1 | 9/2006 | Simske et al. |
| 2006/0262976 A1 | 11/2006 | Hart et al. |
| 2006/0285746 A1 | 12/2006 | Yacoub et al. |
| 2007/0047767 A1 | 3/2007 | Watabe |
| 2007/0172117 A1 | 7/2007 | Wong |
| 2007/0233579 A1 | 10/2007 | Saarinen et al. |
| 2007/0260639 A1 | 11/2007 | Tobin et al. |
| 2007/0286486 A1 | 12/2007 | Goldstein et al. |
| 2007/0286526 A1 | 12/2007 | Abousleman et al. |
| 2008/0060034 A1 | 3/2008 | Egnal et al. |
| 2008/0063279 A1 | 3/2008 | Vincent et al. |
| 2008/0095448 A1 | 4/2008 | Ono et al. |
| 2008/0101726 A1 | 5/2008 | Myers et al. |
| 2008/0118146 A1 | 5/2008 | Cieplinski |
| 2008/0144943 A1 | 6/2008 | Gokturk et al. |
| 2008/0240618 A1 | 10/2008 | Chen et al. |
| 2008/0273807 A1 | 11/2008 | Dauw et al. |
| 2008/0298718 A1 | 12/2008 | Liu et al. |
| 2008/0304753 A1 | 12/2008 | Sohma et al. |
| 2009/0070110 A1 | 3/2009 | Erol et al. |
| 2009/0070415 A1 | 3/2009 | Kishi et al. |
| 2009/0074300 A1 | 3/2009 | Hull et al. |
| 2009/0100050 A1 | 4/2009 | Erol et al. |
| 2009/0125510 A1 | 5/2009 | Graham et al. |
| 2009/0254543 A1 | 10/2009 | Ber et al. |
| 2010/0007601 A1* | 1/2010 | Lashina et al. ................ 345/156 |
| 2010/0040285 A1 | 2/2010 | Csurka et al. |
| 2010/0042523 A1 | 2/2010 | Henry et al. |
| 2010/0080493 A1 | 4/2010 | McGatha et al. |
| 2010/0102119 A1 | 4/2010 | Gustin et al. |
| 2010/0166309 A1 | 7/2010 | Hull et al. |
| 2010/0166339 A1 | 7/2010 | Gokturk et al. |
| 2010/0329574 A1 | 12/2010 | Moraleda et al. |
| 2011/0035662 A1 | 2/2011 | King et al. |
| 2011/0255794 A1 | 10/2011 | Neogi et al. |
| 2011/0286627 A1 | 11/2011 | Takacs et al. |
| 2012/0005046 A1 | 1/2012 | Wu et al. |
| 2012/0019557 A1* | 1/2012 | Aronsson et al. ............. 345/633 |
| 2012/0063686 A1 | 3/2012 | Dauw et al. |
| 2012/0072110 A1 | 3/2012 | Venkatraman |
| 2012/0092329 A1 | 4/2012 | Koo et al. |
| 2012/0114249 A1 | 5/2012 | Conwell |
| 2012/0170852 A1 | 7/2012 | Zhang et al. |
| 2012/0190385 A1* | 7/2012 | Nair et al. .................. 455/456.3 |
| 2012/0242842 A1* | 9/2012 | Yoshigahara et al. ...... 348/207.1 |
| 2012/0245835 A1 | 9/2012 | Weitz et al. |
| 2012/0310643 A1 | 12/2012 | Labsky et al. |
| 2013/0045751 A1* | 2/2013 | Chao et al. .................. 455/456.1 |
| 2013/0054576 A1* | 2/2013 | Karmarkar et al. ........... 707/722 |
| 2013/0218886 A1 | 8/2013 | Graham et al. |
| 2013/0231852 A1 | 9/2013 | Weitz et al. |
| 2013/0322754 A1 | 12/2013 | Lee et al. |
| 2013/0330003 A1 | 12/2013 | Ivanchenko et al. |
| 2013/0346431 A1 | 12/2013 | Erol et al. |
| 2014/0022613 A1 | 1/2014 | Tokuyama et al. |
| 2014/0100997 A1 | 4/2014 | Mayerle et al. |
| 2014/0226868 A1 | 8/2014 | Ruzon et al. |
| 2015/0161480 A1 | 6/2015 | Ruzon et al. |
| 2015/0161715 A1 | 6/2015 | Rose |
| 2015/0170418 A1* | 6/2015 | Flynn .................. G06F 3/04815 345/633 |

FOREIGN PATENT DOCUMENTS

| | | |
|---|---|---|
| CN | 201080008793.1 | 1/2015 |
| JP | 2004-240692 | 8/2004 |
| JP | 2006-331117 A | 12/2006 |

OTHER PUBLICATIONS

"Final Office Action dated Jan. 30, 2012", U.S. Appl. No. 12/378,599, Jan. 30, 2012, 15 pages.

"Final Office Action dated May 14, 2013", Japanese Application No. 2011551189, May 14, 2013, 1 page.

"First Office Action dated Feb. 1, 2013", China Application 201080008793.1, Feb. 1, 2013, 25 pages.

"International Search Report dated Mar. 2, 2010", International Application No. PCT/US2010/020943, 14 pages.

"International Search Report dated Mar. 30, 2010", International Application No. PCT/US2010/024466, Mar. 30, 2013, 2 pages.

"International Search Report dated Mar. 5, 2010", International Application No. PCT/US2010/021206, Mar. 5, 2010, 2 pages.

"International Written Opinion dated Mar. 30, 2013", International Application No. PCT/US2010/024466, Mar. 30, 2013, 2 pages.

"Non Final Office Action dated Jan. 8, 2013", Japanese Application No. 2011-551189, Jan. 8, 2013, 2 pages.

"Non Final Office Action dated Apr. 17, 2012", U.S. Appl. No. 12/321,235, Apr. 17, 2012, 6 pages.

"Non Final Office Action dated May 7, 2012", U.S. Appl. No. 12/319,992, 19 pages.

"Non Final Office Action dated Jun. 24, 2011", U.S. Appl. No. 12/378,599, Jun. 24, 2011, 10 pages.

"Non Final Office Action dated Jun. 6, 2012", U.S. Appl. No. 12/321,235, Jun. 6, 2012, 29 pages.

(56) References Cited

OTHER PUBLICATIONS

"Notice of Allowance dated Oct. 26, 2012", U.S. Appl. No. 12/319,992, 7 pages.
"Notice of Allowance dated Nov. 29, 2012", U.S. Appl. No. 12/321,235, Nov. 29, 2012, 14 pages.
Baatz, Georges et al., "Handling Urban Location Recognition as a 2D Homothetic Problem", http://www.inf.ethz.ch/personal/pomarc/pubs/BaatzECCV10.pdf, 14 pages.
Baumberg, Adam , "Reliable Feature Matching Across Widely Separated Views", Proceedings of Computer Vision and Pattern Recognition, vol. 1, 2000, pp. 1774-1781.
Berretti, Stefano et al., "Merging Results for Distributed Content Based Image Retrieval", Multimedia Tools and Applications, Kluwer Academic Publishers, vol. 24; No. 3, Dec. 1, 2004, pp. 215-232.
Chen, David M. et al., "City-Scale Landmark Identification on Mobile Devices", http://www.inf.ethz.ch/personal/gbaatz/papers/chen11.pdf, 8 pages.
Cheng, Liang et al., "Robust Affine Invariant Feature Extraction for Image Matching", IEEE Geoscience and Remote Sensing Letters, vol. 5, No. 2, 2008, 5 pages.
Chu, et al., "Image-guided tours: Fast-approximated sift with u-surf features", Technical report, Stanford University, Department of Electrical Engineering, 2007.
Fischler, Martin A. et al., "Random Sample Consensus: A Paradigm for Model Fitting with Applications to Image Analysis and Automated Cartography", Communications of the ACM, vol. 24, 1981, pp. 381-395.
Jia, et al., "Photo-to-Search: Using Camera Phones to Inquire of the Surrounding World", Proceedings of the 7th International Conference on Mobile Data Management (MDM '06), 2006.
Labe, T. et al., "Automatic Relative Orientation of Images", Proceedings of the Fifth Turkish-German Joint Geodetic Days, Berlin, Germany, 2006, 6 pages.
Lowe, David G. , "Distinctive Image Features from Scale-Invariant Keypoints", Jan. 5, 2004, 28 pages.
Lowe, David G. , "Distinctive Image Features from Scale-Invariant Keypoints", International Journal of Computer Vision, 2004, pp. 91-110.
Paiva, "Topological Equivalence and Similarity in Multi-Representation Geographic Databases", The University of Maine—Electronic Theses and Dissertations, 1998.
Philbin, James et al., "Object Retrieval with Large Vocabularies and Fast Spatial Matching", Proceedings of Computer Vision and Pattern Recognition, 2007, 9 pages.
Schmid, Cordelia et al., "Local Grayvalue Invariants for Image Retrieval", IEEE Transactions on Pattern Analysis and Machine Intelligence, vol. 19, May 5, 1997, pp. 530-535.
Wang, Yizhou et al., "Object Recognition Using Multi-View Imaging", Signal Processing, ICSP 2008, Ninth International Conference on IEEE, Piscataway, New Jersey, Oct. 26, 2008, pp. 810-813.
Winder, Simon A. et al., "Learning Local Image Descriptors", Proceedings of Computer Vision and Pattern Recognition, 2007.
Winder, Simon A. et al., "Learning Local Image Descriptors", Proceedings of Computer Vision and Pattern Recognition, 2007, 8 pages.
Zheng, Yu et al., "Distributed Architecture for Large Scale Image-Based Search", Multimedia and Expo, 2007 IEEE International Conference, Jul. 1, 2007, pp. 579-582.
Second Office Action mailed Aug. 28, 2013; in corresponding Chinese patent No. 201080008793.1.
Notice of Allowance mailed Jul. 29, 2013 ; in corresponding U.S. Appl. No. 13/491,398.
Notice of Allowance and Fee(s) Due mailed Feb. 4, 2014; in corresponding U.S. Appl. No. 13/429,135.
Non-Final Office Action mailed Mar. 12, 2014; in corresponding U.S. Appl. No. 13/688,772.
Notice of Allowance and Fee(s) Due mailed Feb. 5, 2014; in corresponding U.S. Appl. No. 12/378,599.
US Notice of Allowance issued in U.S. Appl. No. 14/259,002 dated Jul. 8, 2014.
US Notice of Allowance issued in U.S. Appl. No. 13/259,002 dated Oct. 9, 2014.
US Notice of Allowance issued in U.S. Appl. No. 14/252,566 dated Jun. 25, 2014.
US Final Office Action issued in U.S. Appl. No. 13/688,772 dated Sep. 8, 2014.
US Notice of Allowance issued in U.S. Appl. No. 13/688,772 dated Feb. 6, 2015.
US Non-Final Office Action issued in U.S. Appl. No. 14/094,655 dated Jul. 2, 2015.
US Non-Final Office Action issued in U.S. Appl. No. 13/842,433 dated Apr. 23, 2015.
EP Supplemental Search Report issued in Application Serial No. 10732057.4 dated Apr. 22, 2014.
CN Office Action issued in Application Serial No. 201080010602.5 dated May 5, 2014.
CN Office Action issued in Application Serial No. 201080010602.5 dated Nov. 15, 2014.
JP Notice of Rejection issued in Application Serial No. 2013-017926 dated Aug. 5, 2014.
Lowe, D.G. 2004. Distinctive Image Features from Scale-Invariant Keypoints. Jan. 5, 2004.
Cheng et al., "Robust Affine Invariant Feature Extraction for Image Matching", IEEE Geoscience and Remote Sensing Letters, vol. 5, No. 2, Apr. 2008.
Songhu Xu et al. "Boosting text extraction from biomedical images using text region detection" Published in Biomedical Sciences and Engineering Conference (BSEC) 2011—Date of Conference Mar. 15-17, 2011, pp. 1-4.
Brener et al.—A conclusive methodology for rating OCR performance—Artcile first published online Jul. 26, 2005; Journal of the American Society for Information Science and Technology vol. 56, Issue 12, pp. 1274-1287 Oct. 2005.

* cited by examiner

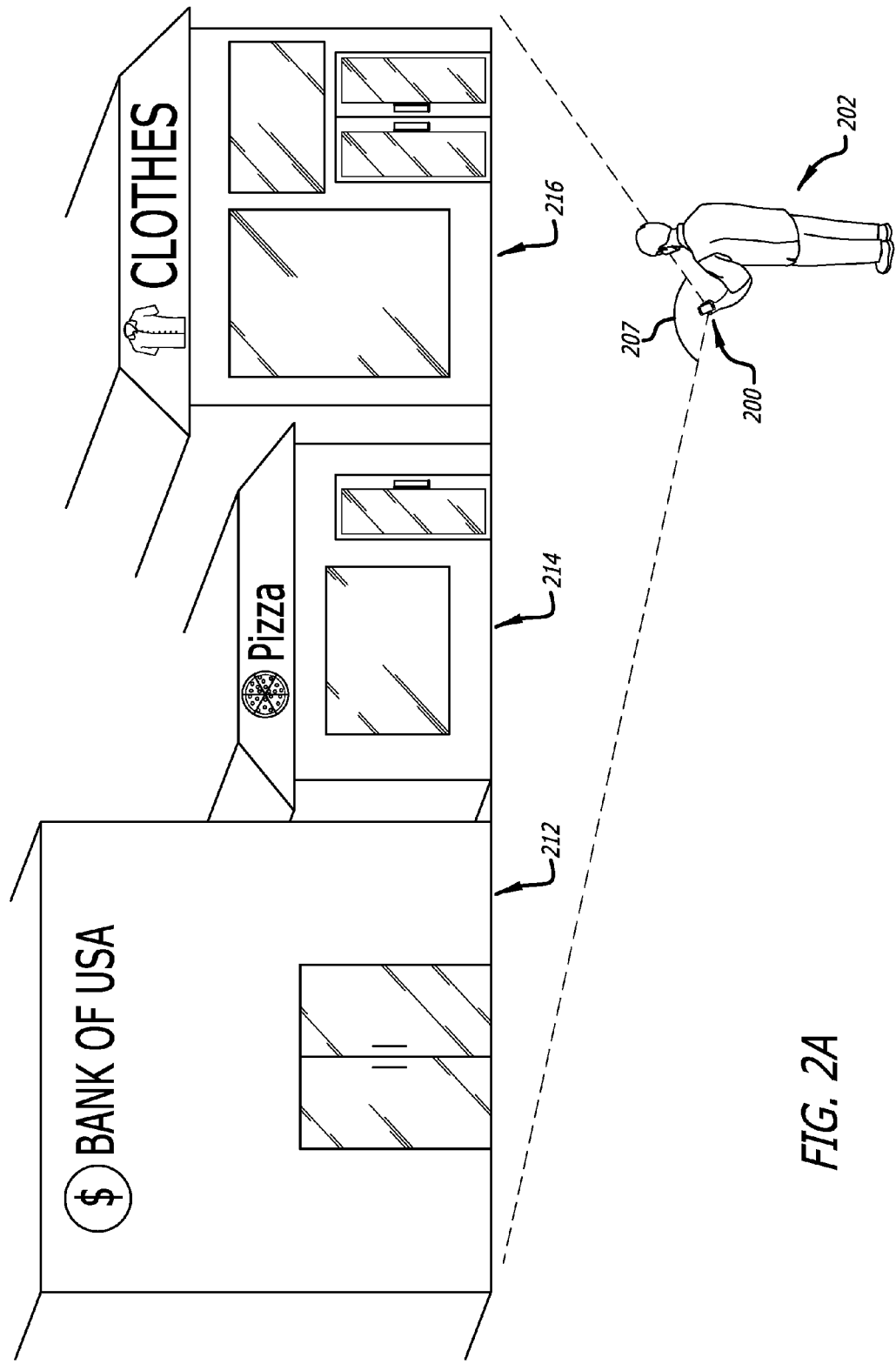

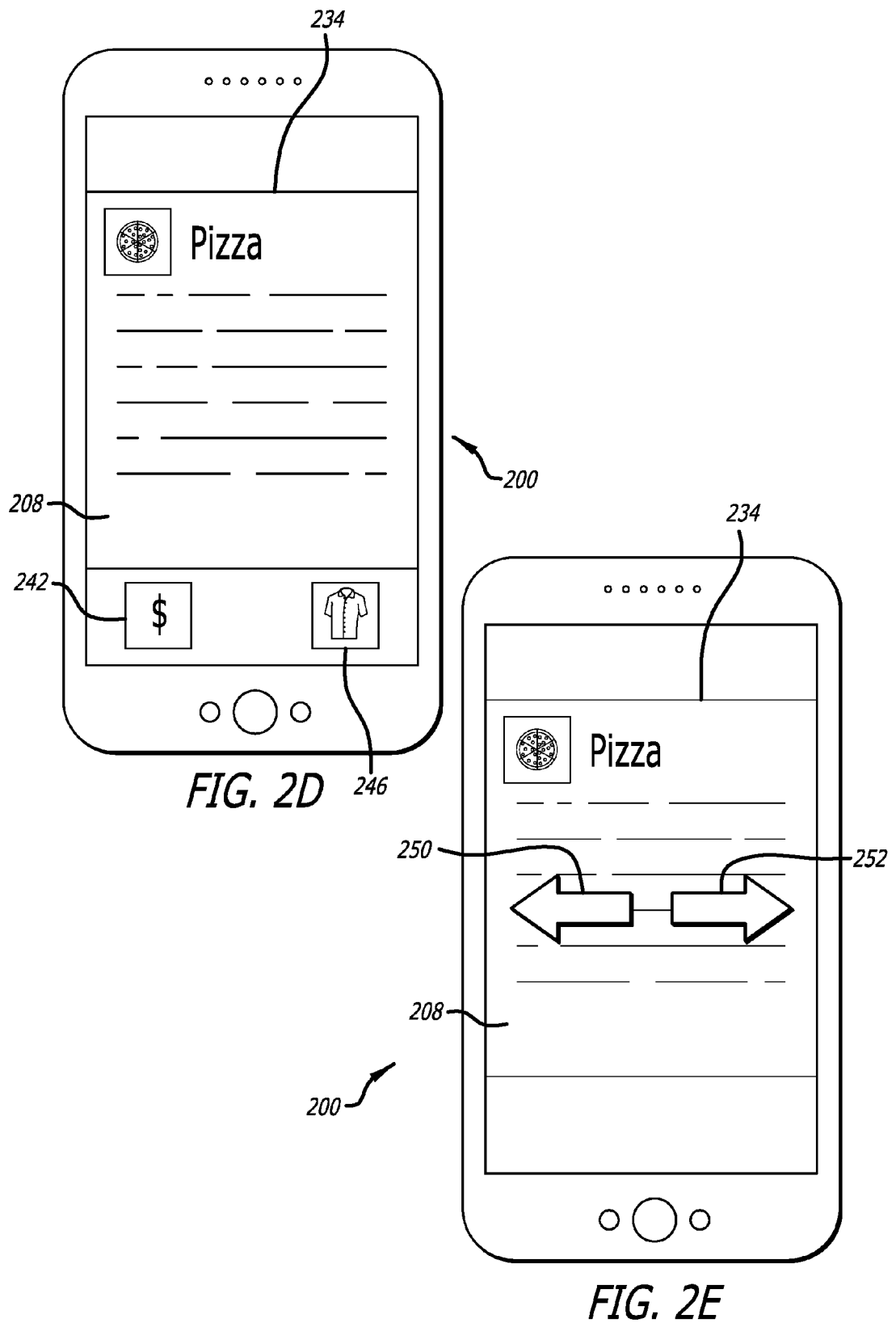

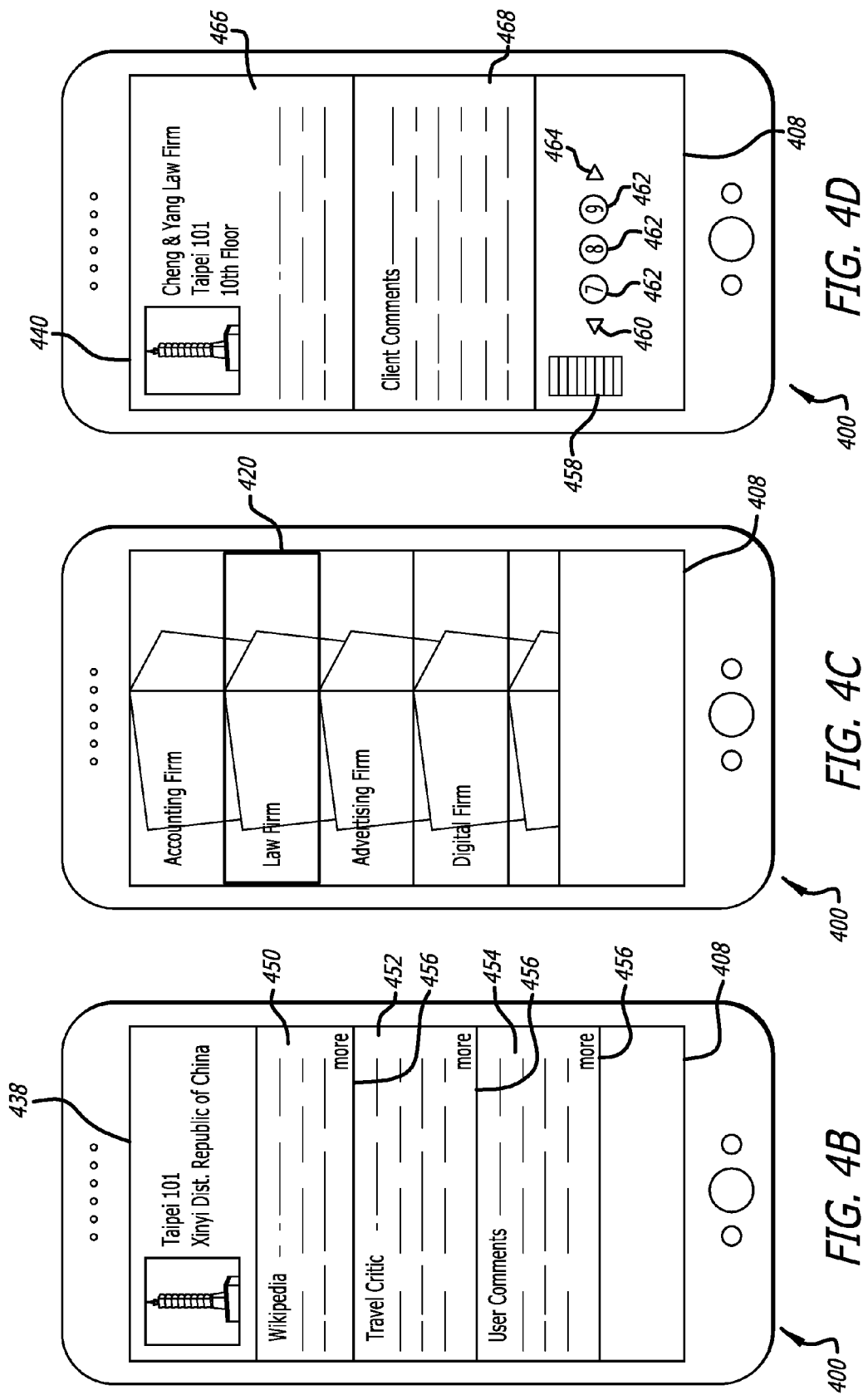

INFORMATION AGGREGATION FOR RECOGNIZED LOCATIONS

BACKGROUND

As personal electronic devices become increasingly sophisticated, people are using such devices in new and interesting ways. For example, personal or portable electronic devices, such as head-mounted displays (HMD) (e.g., glasses, goggles, or helmets), smart phones, tablets, portable media players, and e-book readers, can be used to "augment reality." That is, electronic devices can be used as a viewfinder into the real world and virtual elements can be overlaid to create a reality that is enhanced or augmented. Augmented reality can be implemented for applications as varied as visual design, medical care, gaming, navigation, or information retrieval. Augmented reality for information retrieval can be especially advantageous for users. For example, an electronic device can be used to obtain a view of an object or a location, and information about the object or location can be presented to the user. Conventional information retrieval systems and techniques, however, may not necessarily provide an optimal experience for users. Conventional systems and methods may provide a long list of locations within the vicinity of the user, including locations that are not immediately visible to the user. The user may be required to sort through the long list of locations before the desired location can be found. In other situations, a bare minimum of information regarding a location may be presented which may necessitate additional user effort to access relevant information. In still other cases, conventional devices and approaches may not be able to accurately determine a location that is of interest to a user, or that the user is otherwise attempting to specify, resulting in a number of trials and errors or requiring additional user input before the location is correctly determined.

BRIEF DESCRIPTION OF THE DRAWINGS

Various embodiments in accordance with the present disclosure will be described with reference to the drawings, in which:

FIGS. 2A, 2B, 2C, 2D, and 2E illustrate an example of information aggregation for multiple recognized locations in accordance with various embodiments;

FIGS. 4A, 4B, 4C, and 4D illustrate an example of information aggregation for recognized locations in accordance with an embodiment;

DETAILED DESCRIPTION

Figure 1A:
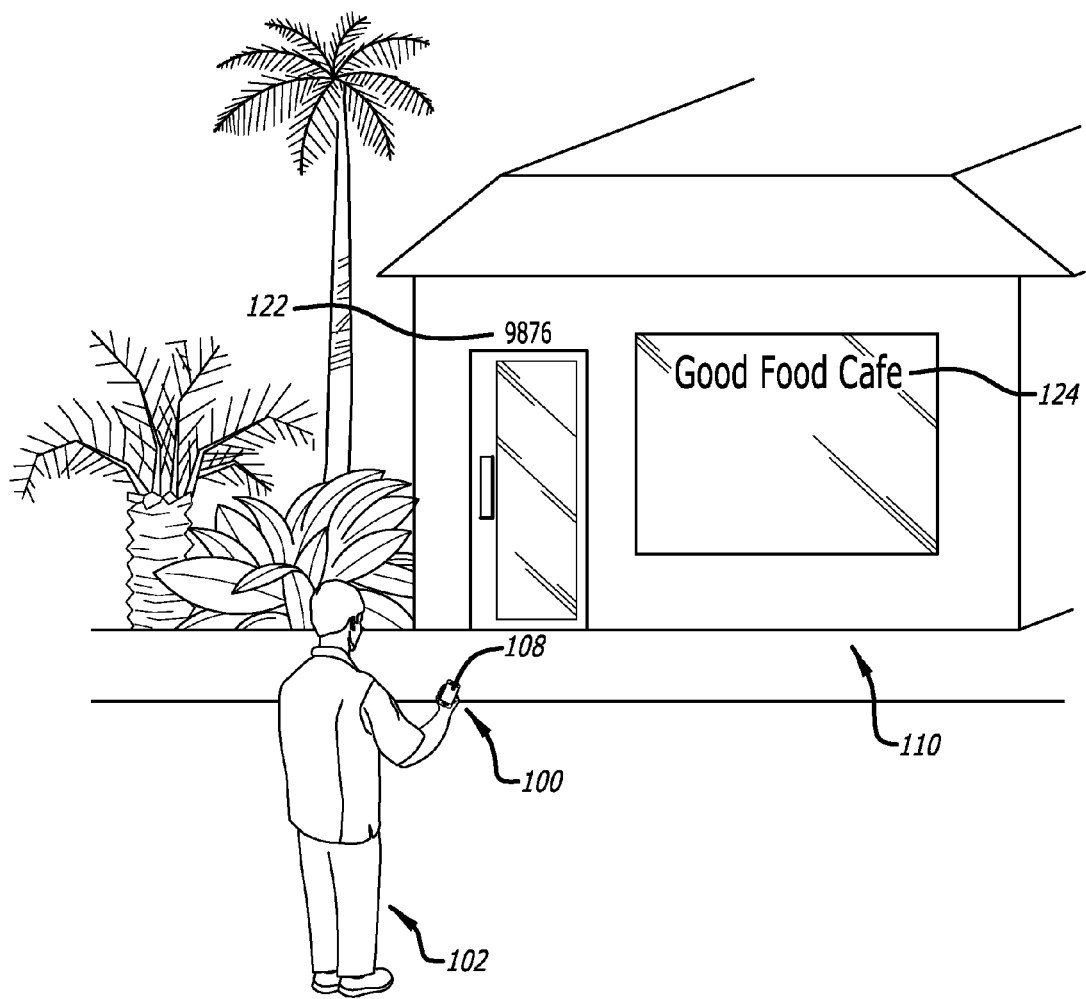
FIGS. 1A, 1B, and 1C illustrate an example of information aggregation for a recognized location in accordance with an embodiment.

Systems and methods in accordance with various embodiments of the present disclosure may overcome one or more of the aforementioned and other deficiencies experienced in conventional approaches to retrieving, aggregating, and/or presenting information for a specified location or object. In particular, an electronic device can be used to capture an image or video of a location, for example, and the captured image can be analyzed using one or more image analysis techniques to determine one or more locations that may be of interest to the user. Relevant information regarding the one or more recognized locations can be immediately presented to the user. User behavior with respect to the information can be tracked and stored for a specific user or a community of users such that the content, the sources from which information may be derived, and the display format can be improved for presenting information about recognized locations in subsequent uses by the user or the community of users.

In certain embodiments, image data can be obtained and matched against an image database to recognize a user's current location. In other embodiments when the captured image data includes textual information, such as an address or a name of a location, the textual information can be recognized using one or more optical character recognition (OCR) engines and the recognized textual information can be used to help determine the location. In still other embodiments, other sensors and/or approaches can be used to enhance location determination. For example, a device can acquire location and/or position information from a cellular phone network; a global positioning system (GPS); a near field communication (NFC) system; other short-range beacon systems based on Wi-Fi, radio frequency (RF), infrared (IR), Bluetooth®; inertial sensors, such as digital compasses, gyroscopes, or accelerometers; barometers; thermometers; altimeters; and other such devices. The location and/or position data can be coupled with the image data to determine a location more rapidly and more accurately.

In at least one embodiment, a computing device can be used to differentiate between floors of a multi-story building or particular heights of recognized locations associated with varying elevations. For example, an image capturing component of the computing device can be used to capture at least a portion of the multi-story building, and the image of the building may be segmented to provide information about businesses occupying each floor. In another embodiment, vertical positioning can also be determined by sensors such as a barometer or an altimeter. In yet another embodiment, inertial sensors such as digital compasses, accelerometers, gyroscopes, gravity sensors, etc. can also be used to determine vertically variable locations. For instance, the inertial sensor data can be integrated with image data and/or geolocation data to determine a building level in the view of the user and/or user device.

Certain embodiments can also provide display of customized information regarding a determined location. A location may be recognized as a restaurant and various types of information regarding the restaurant, such as hours of operation, ratings, user reviews, price range, menu, daily specials, links to the restaurant's website, wait time, etc. can be displayed based on preferences explicitly selected by the user, or can be selected implicitly based on historical interactions of the user (or a community of users) with each of the respective informational elements. The information initially presented to the user may be also be customized according to the type or category of a recognized location. For instance, the informational elements displayed for the user may vary depending on whether the recognized location is a restaurant, movie theater, or shopping mall. Information can also be obtained from various additionally selected sources, such as search engines, local directory services, social networking sites, newspapers and magazines, etc. The user may also customize how information is presented, such as displaying a dialog box that takes up a quarter, a half, or the entire display area of a computing device or displaying an overlay of varying transparency.

In some embodiments, a user's personal data can also be retrieved and presented to the user for a recognized location. The user may have an electronic contacts list or personal calendar, and data associated with the contacts list or calendar can be processed and displayed for an applicable recognized location. For example, a user may have a scheduled appointment with a doctor in a multi-tenant building, and the doctor's phone number and address or the medical appointment may be retrieved and displayed when the user "scans" the building of the doctor's office. As another example, the user may have a bank account, and the user's account balance and most recent transactions can be immediately displayed when the user operates her computing device to scan a branch of her bank. In another case, the user may be a college student, and can capture an image of an academic building to provide the location and office hours of one of her professors. Various other functions and advantages are described and suggested below in accordance with the various embodiments.

Figure 1C:
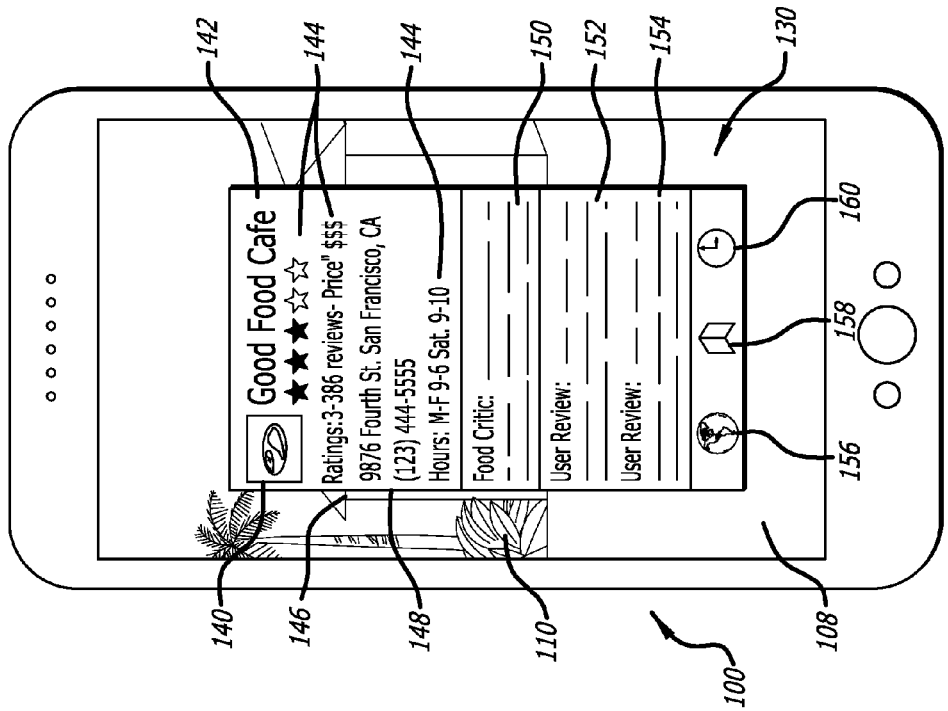
Figure 1B:
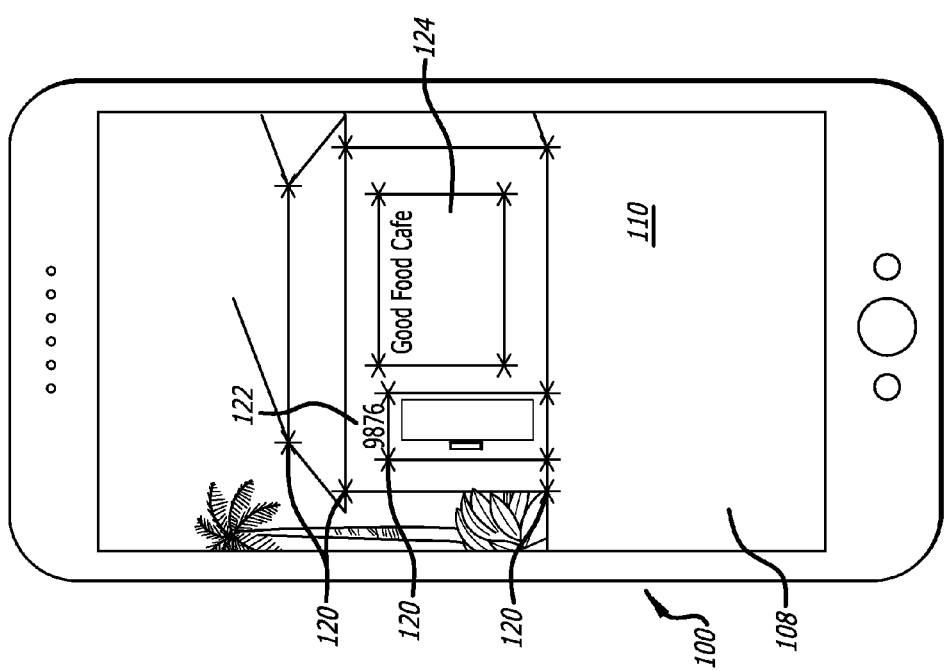

FIGS. 1A, 1B, and 1C illustrate an example of information retrieval for a recognized location in accordance with an embodiment. In FIG. 1A, a user 102 can be seen operating a computing device 100 at a location 110, a restaurant called the "Good Food Café." Although a portable computing device (e.g., a smart phone or tablet computer) is shown, it should be understood that any device capable of receiving and processing input can be used in accordance with various embodiments discussed herein, where the devices can include, for example, head-mounted displays, notebook computers, personal data assistants, e-book readers, and portable media players. In this example, the user 102 desires to obtain relevant information about the Good Food Café 110 using the device 100 to determine whether to patronize the restaurant. The information that may be particularly pertinent to the user can include subject matter such as the type of food served, menu items, prices, user reviews, professional food critic reviews, etc. In at least some embodiments, the user can specify or customize the types of information initially presented for a recognized location. The user can further customize the types of information presented for various classes of locations. For example, the user may find that user reviews are helpful in determining whether the user would like to eat at a restaurant but user reviews are less helpful for the user with respect to clothing stores. Accordingly, the user can select to have user reviews be displayed initially and/or prominently for restaurants and prohibit display of user reviews or have user reviews displayed less prominently for clothing stores.

In other embodiments, the type of information displayed can be determined automatically. For instance, user behavior can be tracked and machine learning can be used to determine the type of information to be displayed for a location or a class of locations. Such machine learning can be based solely on the behavior of the user of a particular device, or can be based on a community of users, such as users sharing certain demographic traits with the user of the particular device. A process that relies on data from a community of users may be characterized as "crowdsourced." Crowdsourcing can also be used to determine the types of information to be displayed for specific locations. For instance, a community of users may find sales or discounts especially helpful for a particular clothing store, and the sales or discounts can then be presented initially and/or prominently for that clothing store.

Information can be determined to be relevant (or not relevant) to users explicitly or implicitly. For example, relevance (or lack of relevance) can be determined explicitly by incorporating user interface elements asking users whether they found certain information helpful or not helpful, or otherwise providing some other kind of voting scheme. Information can be determined to be helpful implicitly based on user interaction with the information. For instance, certain information can be associated with a hyperlink to a webpage and an absolute number of users or a ratio of the users accessing the hyperlink that meets a threshold value can determine whether the information is pertinent (or not pertinent). Alternatively, or in addition, information may be determined to be useful to users implicitly by the users magnifying a display area associated with the information (e.g., "unpinching" a specified area of a touch display) or the users focusing on the information for a certain duration of time (e.g., gaze detection). Other approaches known in the art can also be used in various embodiments.

In the example of FIGS. 1A, 1B, and 1C, the computing device 100 has a display screen 108, which under normal operation will display information to a user facing the display screen (e.g., on the same side of the computing device as the display screen). The computing device 100 also includes an image capture element (not shown) positioned on the back surface of the device to capture image data corresponding to the viewing perspective of the user 102. The image capture element may be, for example, one or more cameras, charge-coupled devices (CCDs), motion detection sensors, ambient light sensors, infrared sensors, or some combination thereof, among many other possibilities. The computing device 100 can also include one or more microphones or other audio capture devices capable of capturing audio data not (shown), such as words spoken by the user 102 of the device. In some embodiments, a microphone can be placed on the same side of the device 100 as the display screen 108, such that the microphone will typically be better able to capture words spoken by a user of the device. In at least some embodiments, the microphone can be a directional microphone that captures sound information from substantially directly in front of the device, and picks up only a limited amount of sound from other directions, which can help to better capture words spoken by a primary user of the device. In other embodiments, a computing device may include multiple microphones arranged to capture 3D audio. In some embodiments, the imaging element of the computing device 100 can include multiple cameras, including at least one wide-angle optical element, such as a fish eye lens, on each of the front surface and the back surface of the device, that enables the device to capture images over a wide range of angles, up to 360 degrees vertically or horizontally, with respect to the device. Further, each image capture element can comprise a digital still camera, configured to capture subsequent frames in rapid succession, or a video camera able to capture streaming video.

In this example, the user 102 can quickly obtain information about the cafe 110 by aiming the camera located on the back surface of the device 100 to capture image data of at least a portion of the Good Food Cafe. FIG. 1B shows a live view of the cafe 110 provided on display element 108 of device 100 according to one embodiment. The device 100 analyzes the captured image data in real time to determine the feature points 120 of the Good Food Café 110, defines feature descriptors from the detected feature points, and sends the feature descriptors to one or more remote servers. Image analysis can be performed to correlate the captured feature descriptors with stored images from a database to determine the location corresponding to the captured image data. In other embodiments, feature extraction and feature descriptor generation occurs on a still image (or video frame) rather than a live view. For instance, the user may be required to press a shutter button of the camera before image analysis occurs. In still other embodiments, image data can be captured locally and the captured image data can be sent (e.g., when the image data comprises one or more images) or streamed (e.g., when the image data comprises video) to the remote server(s), and the feature extraction, feature descriptor generation, and other image analysis can be performed by the remote server(s).

In various embodiments, the image analysis of captured image data can include image matching. Image matching may include sub-processes such as feature extraction and feature matching. Feature extraction techniques are the various approaches to detect and define characteristics of an image or segments of an image. The output of such techniques can sometimes be referred to as feature descriptors or signatures. Features can be global, i.e., represent the entire image, or local, i.e., describe discrete portions of an image. In local feature extraction, a strategy must also be devised on how to segment the image. Such approaches can be based on active contours (e.g., snakes, scissors, level sets), graph-based merging (e.g., watershed, divisive clustering, agglomerative clustering, graph-based segmentation, probabilistic aggregation), mean shift and mode finding (e.g., k-means and mixtures of Gaussians), normalized cuts, graph cuts, etc. Image features may be extracted globally or locally according to color, texture, shape, other salient features, or some combination thereof. Feature extraction based on color can involve calculating histograms for the color components of an image (e.g., red, green, and blue intensities). Texture features are intended to capture the granularity and repetitive patterns of surfaces within an image. For example, glass, brick, and wood siding differ in texture, by smoothness as well as pattern, and such characteristics can be used to describe an image or regions of the image. Texture features can be extracted according to co-occurrence matrices, Tamura's features (e.g., coarseness, contrast, directionality, line-likeness, regularity, roughness), wold features (e.g., periodicity, randomness, and directionality), Gabor filtering, wavelet transforms, etc. Shape features for an image can be extracted according to aspect ratio, circularity, Fourier descriptors, moment invariants, consecutive boundary segments, etc. Other salient features that can be used to describe an image include edges (extracted using, e.g., Canny edge detection), corners (extracted using, e.g., Harris corner detection or Smallest Univalue Segment Assimilating Nucleus (SUSAN) corner detection), regions of interest (extracted using, e.g., LaPlacian of Gaussian pyramids or Difference of Gaussian pyramids), or some combination and/or variation thereof, such as Scale Invariant Feature Transform (SIFT) features as described by David G. Lowe, "Distinctive Image Features from Scale-Invariant Keypoints." *International Journal of Computer Vision* 60.2 (2004), pp. 91-110.

FIG. 1B illustrates one step for one approach for extracting feature points 120, comprising Harris corners, within the image of the location 110. This feature extraction approach is fully described in U.S. patent application Ser. No. 12/319,992, filed Jan. 14, 2009, entitled "Method and System for Representing Image Patches," issued as U.S. Pat. No. 8,406,507, and which is hereby incorporated herein by reference in its entirety. Although FIG. 1B depicts one approach that can be used for feature extraction, it will be appreciated that alternative embodiments implement other approaches for feature extraction. For example, another embodiment uses polar accumulated signed gradient (PASG) feature descriptors, which is fully described in co-pending U.S. patent application Ser. No. 13/429,135, filed Mar. 23, 2012, entitled "Representing Image Patches for Matching," and which is hereby incorporated herein by reference in its entirety. In other embodiments, other approaches for feature extraction are implemented according to color, texture, shape, other salient features, or some combination thereof.

Once the features for an image have been extracted and defined, various feature matching methods can be used to assess the similarity between images. Similarity (or distance) measures will depend on the feature descriptors selected for extraction from an image. Two similarity measures that can be used include the Minkowski distance or the Mahalanobis distance. The Minkowski distance may be appropriate where feature vectors are independent and each feature vector is of equal importance. For example, if D(I, J) is denoted as the distance between a captured image I and a database image J and $f_i(I)$ is the number of features in a bin i of I, the Minkowski distance is defined as:

$$D(I, J) = \left(\sum_i |f_i(I) - f_i(J)|^p\right)^{1/p}$$

where p=1, 2, and ∞, D(I, J) is the $L_1$ distance (also sometimes called the Manhattan distance), $L_2$ distance (also known as the Euclidean distance), and $L_\infty$ (also called the Chebyshev distance), respectively.

The Mahalanobis distance may be appropriate when each dimension of the feature vector is dependent of each other and is of different importance. The Mahalanobis distance is defined as:

$$D(I,J) = \sqrt{(F_I - F_J)^T C^{-1} (F_I - F_J)}$$

where C is the covariance matrix of the feature vectors, $F_I$ and $F_J$ are vectors that list all the entries in $f_i(I)$ and $f_i(J)$.

Other similarity measures that can also be used include the Quadratic Form distance, the Kullback-Leibler divergence, the Jeffrey divergence, the Hausdorff distance, the Mallows distance, the earth mover's distance, the integrated region matching distance, or variations thereof. Certain embodiments may also use various indexing structures or techniques for efficiently searching the image database, including multi-dimensional hashing, which maps feature descriptors into fix-sized bins or buckets based on some function applied to each descriptor vector; locality sensitive hashing, which uses unions of independently computed hashing functions to index features; multi-dimensional search trees such as k-d trees, which divide the multi-dimensional feature space along alternating axis-aligned hyperplanes to maximize search tree balance; etc. Once there are hypothetical or putative matches, techniques such as geometric alignment can be used to verify which matches are inliers and which ones are outliers. For example, the entire query image can be expected to be translated or rotated to match an image in the database image such that the query image can be geometrically transformed to keep only those feature matches that are sufficiently close to the estimated transformation. Processes such as random consensus sampling (RANSAC) or least median of squares (LMS) can be used for verification. One approach for image matching using Eucliden distance as a similarity measure and RANSAC for verification is described in U.S. patent application Ser. No. 12/321,235, filed Jan. 16, 2009, entitled "System and Method to Match Images Using Topologically Equivalent Correspondences," now issued as U.S. Pat. No. 8,401,342, and which is hereby incorporated herein by reference in its entirety. These image matching techniques are well known to one of ordinary skill in the art, and other than what is discussed in U.S. patent application Ser. No. 12/321,235, will not be discussed herein in detail.

In at least some embodiments, image analysis can be combined with location and/or position determination techniques to assess a user's location more quickly and precisely. For example, geolocation can be estimated according to data from GPS, an RFID system, a cellular network, a Wi-Fi positioning system, etc. Such conventional systems and approaches can provide a rough estimate of a user's location, but may only be accurate up to tens of meters. Moreover, these systems may not be able to take into account the user's immediate line of sight. Thus, in various embodiments, geolocation data can be combined with captured image data to determine the user's location. For instance, the geolocation data can be used to filter or circumscribe the set of images of a comprehensive image database to be which the captured image would be compared against. Such an approach can substantially reduce the amount of processing for image analysis and yield more precise location information. In another embodiment, sensor data, such as from digital compasses, gyroscopes, or accelerometers, can be used to determine a pose (i.e., position and orientation) of a computing device. The pose data can be combined with image analysis and/or geolocation positioning to determine a precise location for the user of the device. For example, image analysis may be used to determine a location and geolocation data from a GPS and a digital compass reading of the direction the user is facing can be used to verify the recognized location with high confidence. In still other embodiments, vertical positioning can be determined from sensors such as barometers or altimeters.

In various embodiments, image analysis may also include text extraction, such as a street address (e.g., element 122 in FIGS. 1A and 1B) or a business name (e.g., element 124 in FIGS. 1A and 1B), of a location of an interest using an OCR process. In general, an OCR process may refer to an application that converts image data representing text, which can be embodied as a combination of pixels or vectors, to a machine-readable format, such as the American Standard Code for Information Interchange (ASCII), Unicode, or variations thereof. Textual data from an image can be used to for determination of a user's location. Geolocation data derived from GPS or other geolocation techniques and textual data of a current location, such as a street address or business name, may often be less process intensive than image matching and can provide better results than image matching. Thus, in various embodiments, OCR and other text recognition processes can be used as the primary image analysis technique or to the exclusion of other image analysis techniques. In other embodiments, OCR and other text extraction approaches may be used to enhance other processes. For example, search of an image database can be narrowed or filtered to images with metadata associated with text recognized by the OCR process. Alternatively, or in addition, recognized text may increase the confidence levels of a determined geolocation derived from GPS and/or other geolocation processes. It will be appreciated that there are numerous approaches for such image-to-text conversion. In some embodiments, the OCR process may be a stand-alone application that resides entirely on the computing device. In other embodiments, the OCR application may operate according to a client-server model in which the server receives an image containing text from the client and responds by providing the text in a format such ASCII or Unicode. One such approach is described in co-pending U.S. patent application Ser. No. 13/688,772, filed Nov. 29, 2012, entitled "Image-Based Character Recognition," which is hereby incorporated herein by reference in its entirety. OCR is known in the art and, other than what is described in U.S. patent application Ser. No. 13/688,772, will not be discussed herein in detail.

FIG. 1C illustrates an example of a user interface displayed on touchscreen 108 of computing device 100 which provides information for the determined location 110. As depicted in FIG. 1C, the user interface comprises an opaque overlay 130 of a live view of the recognized location 110, the Good Food Café, that substantially fills the touchscreen 108. In other embodiments, different dimensions and characteristics for the overlay can be used, e.g., a complete fill of the display area or a fill of a smaller ratio of the display area. In addition, the overlay may be transparent or semi-transparent according to various percentages in other embodiments. A user interface including a transparent overlay may be preferable in many instances, as such an implementation can help the user to associate a recognized location with the information corresponding to the recognized location. For example, if a current view of a location is not recognized or recognized incorrectly, the user can reposition her device to obtain a different and/or better view. In various embodiments, the overlay fill ratio and transparency percentage can be customized by the user. The overlay 130 includes an icon or image 140 representing the recognized location 110. The icon or image can be a favorite icon or "favicon" (also referred to as a shortcut icon, website icon, URL icon, or bookmark icon) associated with a website for the recognized location. Alternatively, the image can comprise a generic logo representative of the type of establishment of the recognized location, a company logo, or some other image associated with the recognized location. In one embodiment, the icon or image can be customized by the user, including an option to select from among one or more crowdsourced icons or images. The overlay 130 further includes the name or title 142 of the recognized location and other informational elements 144, such as a crowdsourced star rating, number of user ratings corresponding to the recognized location 110, price rating, hours of operation, or any number of other informational elements that a particular user or community of users determine to be relevant about the recognized location. The overlay 130 can also include a number of selectable or interactive user interface elements. In this example, the address 146 for the recognized location 110 can direct a user to a map interface that displays a bird's eye view of the recognized location as well as neighboring locations. The phone number element 148 is also interactive in that the selection of the phone number element 148 can result in the automatic dialing of the phone number. In addition, the user interface shown in FIG. 1C also includes a number of selectable icons, such as globe icon 156 that links to a website associated with the recognized location 110, menu icon 158 that links to a menu for the Good Food Café, and a reservation icon 160 that links to a website, application, service reservation line, etc. allowing the user to make reservations at the Good Food Café.

FIG. 1C also illustrates additional informational elements such as food criticism element 150, user review 152, and user review 154. Such informational elements may comprise an extract or a portion of full content, and interactive elements may be invoked to enable the user to view the full content. In various embodiments, informational elements, such as user reviews, may be aggregated from multiple sources including various search engines, local directory services, social networking sites, newspaper and magazines, etc., operated by the computing device manufacturer or the software application provider. Alternatively, or in addition, informational elements can comprise data aggregated from a third party service provider. Informational elements can also be obtained from public domain sources such as the U.S. government (e.g., content on .gov and .mil websites). In the example of FIG. 1C, the user reviews 152 and 154 may be selected for immediate display on overlay 130 based on a determination of whether there is a close relationship between the user and the author of the user review. For instance, authors of user reviews who are directly connected (or a secondary or tertiary connection) to the user within a social or professional network may be more relevant to a particular user, and such user reviews may be ranked, weighted, or sorted higher than user reviews of authors having no connection to the user. Similarly, an author of a user review may be one of the user's contacts in an address book or appear among the user's emails, and this can result in the author's user review being ranked, weighted, or sorted higher than other user reviews. In another embodiment, user reviews may include a feedback mechanism that allows a community of users to "vote" on the helpfulness of a review and the most helpful positive user review and the most helpful negative user review can be displayed initially in the overlay. In various embodiments, users can customize what factors are considered in ranking, weighting, or sorting user reviews. Alternatively, user behavior can be tracked and machine learning can be used to rank, weight, or sort user reviews based on implicit indications of relevance such as clicking on a particular user review or a length of time spent by the user reading the review.

In other embodiments, informational elements can also include subject matter such as recommendations for particular dishes or drinks; daily specials; discounts; recommendations for alternative restaurants sharing common characteristics (e.g., proximity, price range, food genre, demographics of customers, etc.) with the determined location; hyperlinks to search engine results; etc. Each of the informational elements is customizable by the user such that the user can adjust the ordering of data of the various information sources, the amount of content to be displayed from each of the information sources, the type of content to be displayed from the information sources, etc. For example, an informational element can include a selectable user interface element that enables the user to remove display of the informational element. When the user selects to remove the informational element, the user can be prompted whether she intends to remove only the one instance or all references from a source associated with the informational element. The informational elements can also include feedback mechanisms that allow a user to designate whether a particular informational element was helpful or unhelpful to the user. Such feedback can also be aggregated for a community of users and used to determine what information elements are presented to users. In various embodiments, more or fewer user interface elements can be presented to the user in this manner.

Figure 2B:
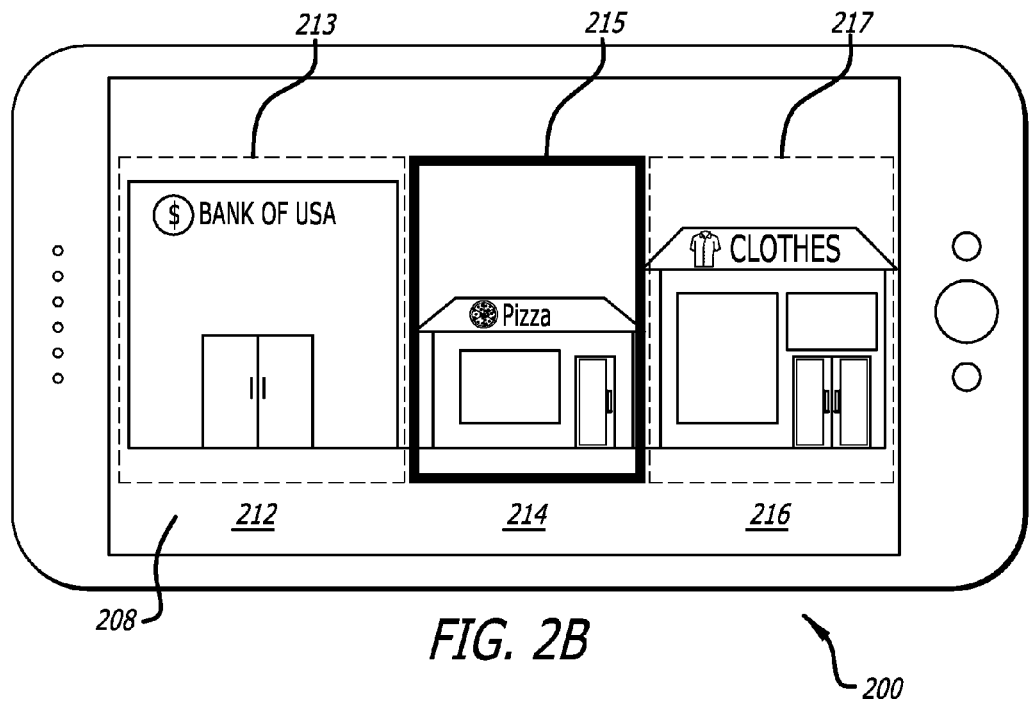

FIGS. 2A, 2B, 2C, 2D, and 2E illustrate information aggregation for multiple locations in accordance with various embodiments. In this example, user 202 is operating a computing device 200 incorporating an imaging capturing component (not shown) having a viewing angle 207 that is able to capture an image of at least a portion of each of the locations 212, 214, and 216. Location 212 corresponds to a commercial bank, location 214 corresponds to a pizza shop, and location 216 corresponds to a clothing store. FIG. 2B depicts what is presented to the user on a display element 208 of the computing device 200 at a moment in time before any of the locations 212, 214, and 216 have been determined. In this example, the image pre-processing that occurs on the computing device 200 is the segmentation of the image into recognizable discrete elements comprising each of the locations 212, 214, and 216, as illustrated by bounded boxes 213, 215, and 217, respectively. At this particular moment in time, the image segment of location 214 is sent to a remote server for image processing and other tasks as illustrated by the bold bounded box 215. In other embodiments, the pre-processing that occurs on the device 200 may include binarizing of the segments of the image to recognize text within the segmented images using distributive OCR or other text recognition techniques. Each image segment can be distributed across several different servers such that image processing (e.g., OCR, image matching) and information retrieval can occur in parallel, and the output from each of the parallel processes can be collated and compared with one another to obtain user locations with higher confidence levels. In other embodiments, a single still image (or video frame) comprising multiple locations can be offloaded to remote computing resources, and the remote computing sources can perform the segmentation and processing. One such approach for parallel or distributed image matching is described in co-pending U.S. Patent Application No. 23/378,599, filed Feb. 18, 2009, entitled "Method and System for Image Matching," and which is hereby incorporated herein by reference in its entirety.

Figure 2C:
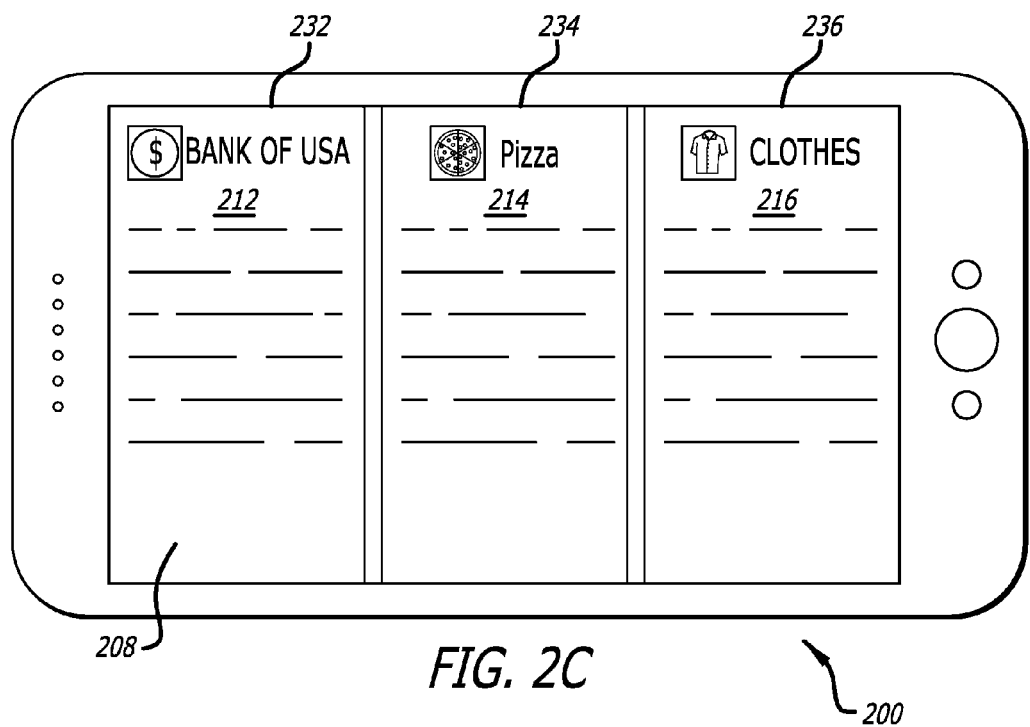

FIG. 2C illustrates a mode of operation, multi-location mode, in accordance with an embodiment. In this example, multiple locations 212, 214, and 216 have been identified from the aggregation of image and text data and other relevant data such as geolocation information or other sensor data. The user is then presented with overlays 232, 234, and 236 on display element 208 of computing device 200 that correspond respectively to recognized locations 212, 214, and 216. In addition to an associated image or icon, name, address, phone number, and other such informational elements, the overlay 232 for the Bank of U.S.A. 212 can include informational elements such as contact information from a user's contact list or address book for a personal banker or loan agent employed by the bank. If the user has an account at the bank, the overlay 232 can include an interface that enables the user to log into her bank account and the overlay 232 could then display informational elements such as the user's balance and latest transactions. In addition, the overlay 232 may include interactive elements such as links to access the user's statement or a user interface that enables the user to make banking transactions. The log in information and/or password can also be stored to present the user account information for subsequent access such that the user does not have to enter the log in information and/or password every time the user attempts to acquire information about bank 212.

The overlay 234 for the pizza shop 214 includes some of the same as well as additional informational and interactive elements discussed above with respect to the overlay 130 in FIG. 1C, such as an associated image, name of the proprietorship, user rating, price rating, address, food critic review, user reviews, menu, reservation service, and other relevant informational elements. In one embodiment, the user interface can include a categorization of locations organized as a hierarchical tree. The root node of the tree may be associated with information for a generic user interface layout that is applicable for all locations that have not been categorized and/or not specifically associated with a particular user interface layout. Child nodes of the root node may comprise categories for types of locations, such as restaurants, cafes, retail stores, financial institutions, residences, parks, landmarks, etc. The child nodes may also be parent nodes with their own child nodes representing subcategories. For example, the Good Food Café 110 (of FIGS. 1A, 1B, and 1C) may correspond to a parent category such as a restaurant and a subcategory such as a diner. The pizza shop 214 (of FIGS. 2A, 2B, 2C, and 2D) may also correspond to the restaurant parent category and a subcategory such as a pizzeria. Each node can be associated with its own user interface layout (or inherit a user layout of a parent node if no specific user interface layout has been designated). For instance, if a specific user interface layout has been defined for the diner subcategory, the Good Food Café 110 may be associated with that user interface layout since it has been subcategorized as a diner. If no specific user interface layout has been established for the pizzeria subcategory, the pizza shop 214 may be associated with a user interface layout associated with the restaurant category or the root node. In various embodiments, the hierarchical category tree and user interface layouts associated with each node of the tree can be customized by a user. FIG. 2B also includes an overlay 236 for clothing store 216. The overlay 236 may include some of the same or different informational and interactive elements as the overlays 130 (of FIG. 1C) or 232 or 234 (of FIG. 2C), including hours of operation, ratings, user reviews, price ranges, links to contact information, product inventory/availability of products, etc.

FIG. 2D illustrates a mode of operation, single location mode, in accordance with an embodiment. In this example, multiple locations may be in close proximity with one another (such as shown in FIGS. 2A and 2B), but the user has selected to operate the computing device in single location mode and desires information about only one of the locations. Various approaches can be used to distinguish a single location from multiple locations, and will be discussed in detail further below. Here, the user operates a computing device with a camera that captures image data for at least a portion of each of the plurality of storefronts 212, 214, and 216. However, a single overlay 234 for pizza shop 214 is presented for display on display element 208 of device 200. The overlay 234 can include some of the same or different informational and interactive elements as the overlays 130 (of FIG. 1C) or 232, 234, or 236 (of FIG. 2C). The overlay 234 can also include bank icon 242 and clothing icon 246, which correspond to recognized locations 212 and 216 (of FIG. 2A), respectively. Bank icon 242 and clothing icon 246 are interactive elements that, upon selection by the user, will display a single overlay for bank 212 and clothing store 216, respectively. In one embodiment, bank icon 242 and clothing icon 246 are presented as alternative options when multiple locations are captured by an image or video of a user device and an overlay for only a single location, e.g., pizza shop 214, is selected for display. In another embodiment, bank icon 242 and clothing 246 are presented on a user interface "shelf" representing previously recognized locations to which the user can return if the user subsequently desires to seek information about those previously determined locations. In such an embodiment, the shelf can be ordered according to the time of recognition with the latest determined location having associated information presented in the overlay and the next latest determined location presented as a selectable element at the far right of the shelf for a left to right ordering. Alternatively, the selectable element may be located at the far left of the user interface if the ordering is right to left. The user may customize the number of items that appear on the shelf, as well as the ordering, e.g., left to right or right to left. In yet another embodiment, recognized locations can be stored along with metadata such as the time corresponding to when each location was determined. The user can then use the stored data to retrace her steps, or remap her day's itinerary. In some embodiments, in addition to previously determined locations, the user interface shelf may also include previously recognized objects of interest.

FIG. 2E illustrates another example of single location mode in accordance with an embodiment. Similar to the situation of FIG. 2D, multiple locations (e.g., storefronts 212, 214, and 216 of FIGS. 2A and 2B) may be closely proximate to one another, but the user has selected to operate a computing device 200 in single location mode, such that only information about one of the locations is provided to the user. Accordingly, a single overlay 234 with information associated with pizza shop 214 is presented. The overlay 234 can include some of the same or different informational and interactive elements as the overlays 130 (of FIG. 1C); 232, 234, 236 (of FIG. 2C); or 234 (of FIG. 2D). If the user instead wishes information for a recognized location to the left of pizza shop 214, such as bank 212, the user can perform a gesture such as swiping touch display element 208 from left to right or turn the device 200 leftward, as indicated by 250. Similarly, if the user wants information for a recognized location to the right of pizza shop 214, such as clothing store 216, the user can perform a gesture such as swiping touch display 208 from right left or turn the device 200 rightward, as indicated by 252. In other embodiments, approaches demonstrated in FIG. 2D, e.g., selectable icons or a user interface shelf, can be combined with the approaches of FIG. 2E, e.g., user gestures or device motion detection.

Figure 3A:
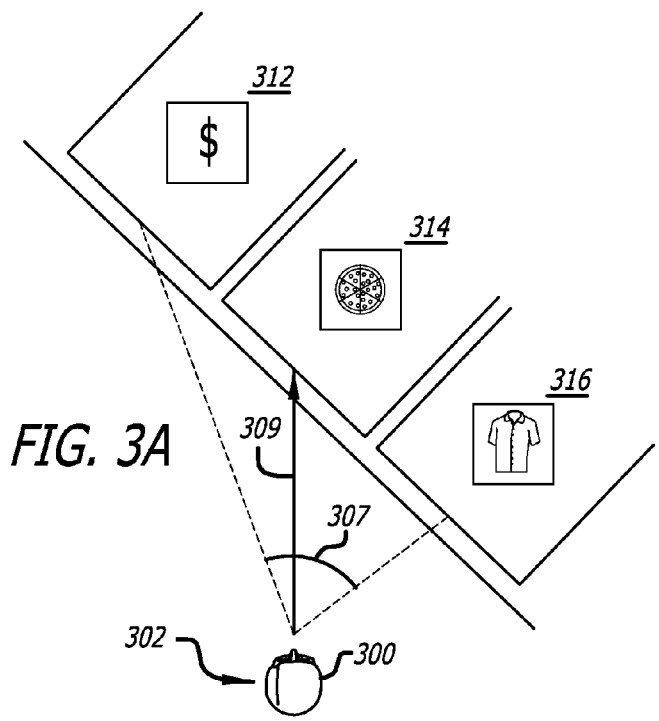
FIGS. 3A, 3B, and 3C illustrate examples for identifying locations in accordance with various embodiments.

When a computing device operates in single location mode in accordance with certain embodiments, various approaches can be used to determine a single location from among multiple locations. At least some embodiments can use image analysis techniques to resolve for a single location. For example, a single location can be selected based on an assumption that the user is seeking information about a location that is the focus of the user's attention rather than a location that may be at the periphery of the user's viewing perspective. In one embodiment, a location situated substantially at the center of an image (or video) can be determined to be the user's selected location. FIG. 3A illustrates an example of an implementation of this approach. In FIG. 3A, user 302 is shown using HMD glasses 300 in front of bank 312, pizza shop 314, and clothing store 316. The viewing angle 307 corresponds to one or more image capture components incorporated in HMD glasses 300, and is sufficiently wide to capture at least a portion of each of the locations 312, 314, and 316. At a particular moment in time when an application in accordance with an embodiment is activated, and the user directs his view towards the bank 312, pizza shop 314, and clothing retailer 316, the pizza shop 314 is determined to be the user's selected location (as illustrated by the solid line 309) because it lies in the center of viewing angle 307.

Figure 3B:
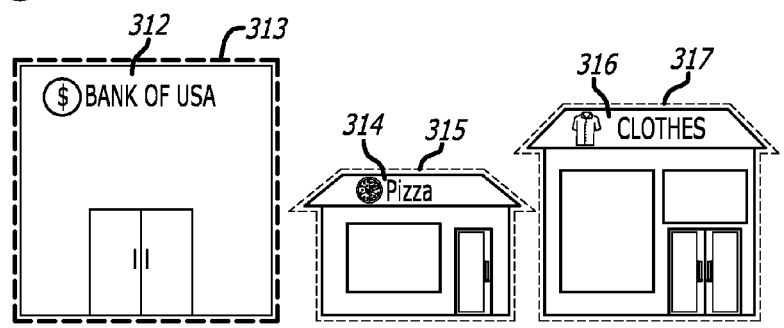

In other embodiments, the image (or video) can be analyzed and segmented according to distinct locations, and the location comprising the majority of the image (or video) area can be determined to be the user' selected location. FIG. 3B demonstrates one such example. An image (or video) as depicted by FIG. 3B can be captured by a user device. Locations 312, 314, and 316 can be recognized and separately segmented, as shown by bounded boxes 313, 315, and 317, respectively. The surface area of each of the bounded boxes 313, 315, and 317 can be calculated, and the location corresponding to the greatest surface can be the user's selected location. Here, bank 312 may be selected as its surface area is the greatest among the locations 312, 314, and 316. Alternatively, or in addition, determination of a selected location may be based on the location comprising an image (or video) area meeting or exceeding a threshold value or percentage of the whole image.

Figure 3C:
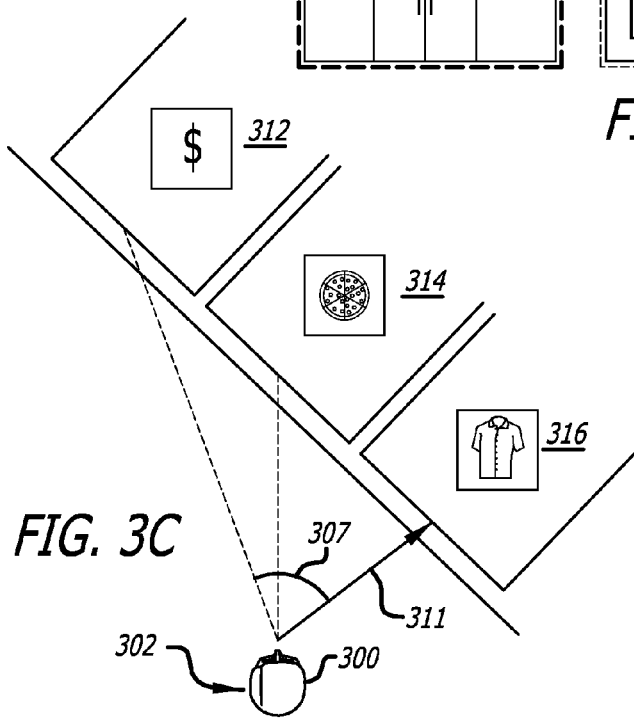

In still other embodiments operating in single location mode, a selected location can be based on analysis of secondary location data from other sensors of a computing device. For example, a location that is most proximate to a user can be determined to be a selected location. FIG. 3C illustrates one such approach. In this example, user 302 is operating HMD glasses 300 such that viewing angle 307 for an image capturing component (not shown) incorporated in the glasses 300 acquire substantial portions of bank 312, pizza shop 314, and clothing shop 316. User 302 is positioned at an angle with respect to locations 312, 314, and 316 such that location 314 is in the center of the viewing angle 307 of HMD device 300. However, in this example, as illustrated by solid line 311, clothing retailer 316 is determined to be the selected location because location 316 is closer in proximity to user 302 than locations 312 and 314. Various algorithms and devices for determining distance and range can be implemented according to this approach. In one embodiment, the computing device can include one or more structured light (e.g., infra-red (IR)) emitters and sensors to obtain distance or range information by projecting a regular pattern of light and analyzing the reflected pattern. In other embodiments, secondary location data such as distance and range information can be determined using one or more distance sensors, range finders, ultrasonic transceivers, or other such devices capable of providing distance information. Such systems may use time of flight, trilateration, triangulation, or other such algorithms to determine range or distance. Various other approaches can be utilized as well as should be apparent to one of ordinary skill in the art in light of the teachings and suggestions contained herein.

Figure 4A:
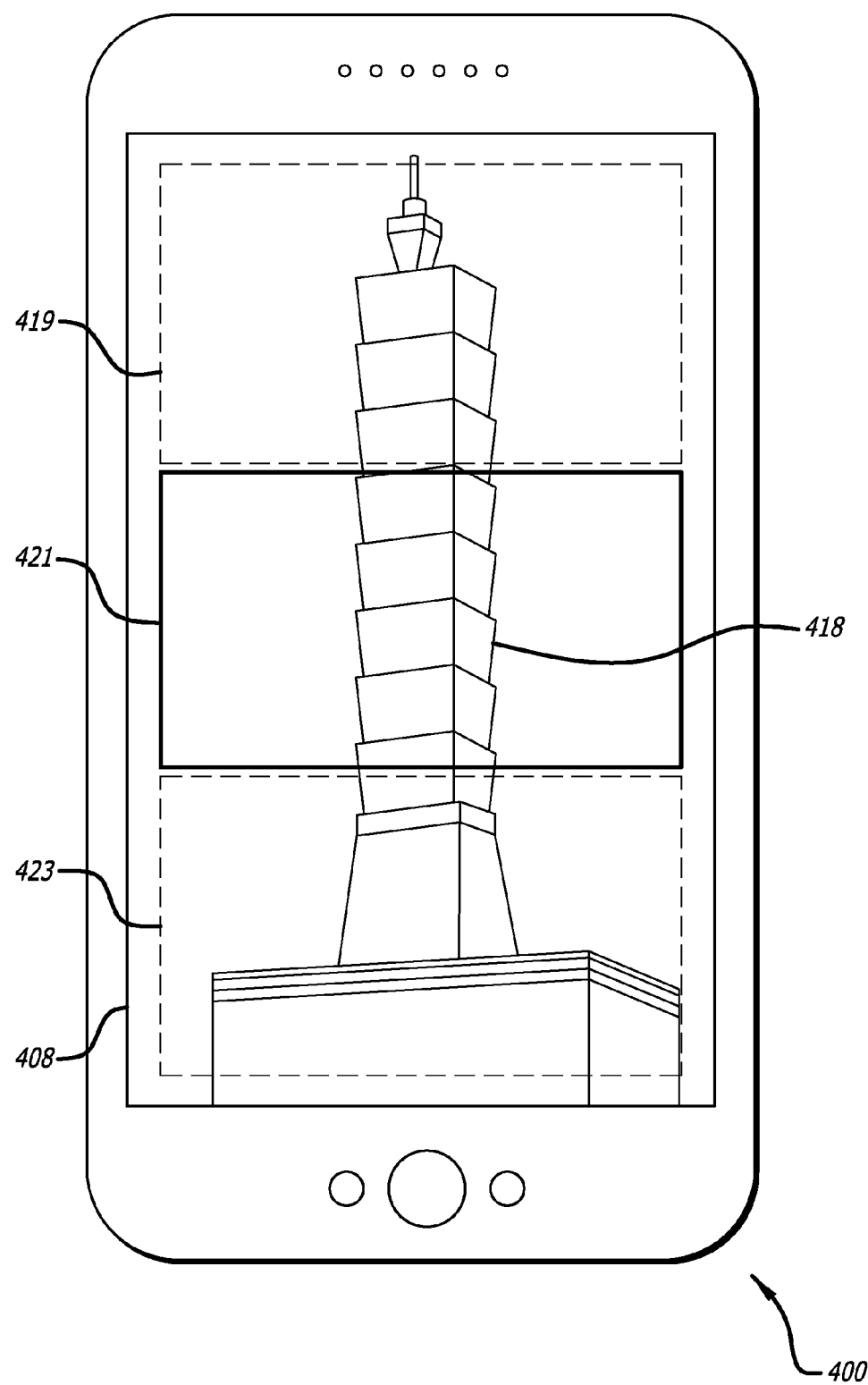

FIGS. 4A, 4B, 4C, and 4D illustrate examples of information aggregation according to an embodiment. In the example of FIG. 4A, a user (not shown) is employing a portable computing device 400 as a live viewfinder to display the Taipei 101 building 418 located in Taipei, Republic of China on a display component 408 of the computing device. Depending on where the user is situated, the user may also be using zoom features of a camera of the computing device 400 to zoom in (or out) to capture a desired perspective. As the user is operating the camera of the computing device 400, the Taipei 101 building 418 may be recognized and relevant information about the building can be presented to the user. In accordance with one embodiment, a dialog box or informational overlay 438 may be displayed on the display element 408 of the computing device 400 as depicted in FIG. 4B. The overlay may include some of the same or different informational and interactive elements as the overlays 130 (of FIG. 1C) or 232, 234, or 236 (of FIG. 2C). It will be appreciated that the overlay may also be presented to the user in various ways, such as a semi-transparent overlay that enables the user to partially retain a live view of the recognized location or as a dialog box taking up a selected percentage of the display area of the screen (e.g., 25% or 50%). Here, the Taipei 101 building 418 is a Taiwanese national landmark, and additional sources of information regarding the building may be available. Although a building is illustrated here, it will be appreciated that recognizable locations may include other types of landmarks and/or objects such as Mount Rushmore in Keystone, S. Dak., the Liberty Bell in Philadelphia, Pa., or the U.S.S. Arizona Memorial in Honolulu, Hi. A recognized location that is a landmark may be historically and/or culturally significant so as to be included on public open source databases such as websites for the National Parks Service (http://www.nps.gov/), Washington State Parks (http://www.parks.wa.gov/), Wikipedia®, etc. In this example, overlay 438 includes an informational element 450 comprising textual data from Wikipedia® about the Taipei 101 building. Overlay 438 also includes a second informational element comprising travel criticism 452, and a third informational element comprising 454 user comments concerning the Taipei 101 building. Each of the informational elements 450, 452, and 454 further includes a selectable element 456 that enables the user to navigate to a new overlay with additional information respectively corresponding to the associated informational element. In another embodiment, selection of one of the selectable elements 456 may instantiate a browser application directed to a website corresponding to Wikipedia®, a travel magazine, or a travel website, respectively.

Although the information presented in overlay 438 in FIG. 4B may be relevant and useful to a tourist or visitor to Taipei, such information may be less pertinent for a local resident or businessperson who may be conducting business inside the Taipei 101 skyscraper and may be interested in other types of information about the building. In one embodiment, the latter type of user may perform a user gesture such as shaking her device to repopulate the informational overlay with more useful information. The user's request to repopulate the informational overlay and a subsequent selection of another informational element can be tracked and stored to determine types of information that may be more germane for the user or a demographically similar user. In another embodiment, the user's residential address, office address, and/or historical geolocation data may be analyzed to determine that the user is a local resident or a frequent visitor to Taipei. It may be assumed that such a user may not have the same informational needs as a tourist, and suitable information can be selected and presented to the user. Alternatively, the user's residential address, business address, historical geolocation data, recent shopping history, cash/credit transactions, etc. may indicate that the user is visiting Taipei for the first time, and the information presented to the user can be catered for the user accordingly.

In another embodiment, the user may perform a user gesture (e.g., pinching to zoom in), articulate a voice command (e.g., "Detailed view"), or select a user interface element to acquire a more granular or detailed view of a recognized location. FIG. 4A illustrates how the Taipei 101 building 418 can be segmented according to sections 419, 421, and 423. Here, a more granular view of the middle section 421 is selected, as indicated by the bolded line. In other embodiments, a multi-story building may be segmented based on each floor of the building. The approaches discussed in FIGS. 3A-3C for selecting a single location from multiple recognized locations can also be used to select a single floor or segment from a multi-story building. After a middle section 421 is selected, a more detailed view of the selected selection may be presented to the user, as depicted in FIG. 4C. In particular, FIG. 4C illustrates a granular view of the Taipei 101 building on display element 408 of computing device 400. The granular view of the Taipei 101 building comprises four overlays for an account firm, a law firm, an advertising firm, and a digital firm corresponding to respective floors of the middle section of the building. Each of the overlays can be selected to provide a more detailed informational overlay. Here, the user has selected to review more specific information about the law firm as indicated by the bold bounded box 420.

Upon selection of a particular floor of a multi-story building, a more detailed overlay can be presented to the user as shown in FIG. 4D. FIG. 4D illustrates an informational overlay 440 for a law firm which is displayed on a touchscreen 408 of computing device 400. The informational overlay includes an informational segment 466 comprising an icon or image associated with the law firm, the name of the law firm, address, and other relevant information. The informational overlay 440 can also include some of the same or different informational and interactive elements as the overlays 130 (of FIG. 1C); 232, 234, and 236 (of FIG. 2C); 234 (of FIG. 2D);

and 438 (of FIG. 4B). The informational overlay 240 can also include a landmark icon 458, which will present the user with information about the entire building. For example, selection of the landmark icon 458 may direct the user to an overlay such as the overlay 438 in FIG. 4B. The informational overlay 240 can also include navigational elements 460, 462, and 464. Each of navigational elements 462 correspond to different floors of the Taipei 101 building, navigational element 460 may repopulate navigational elements 462 with a different set of lower floors, and navigational element 464 may repopulate navigational elements 462 with a different set of higher floors. In another embodiment, landmark icon 458 and navigation elements 460, 462, and 464 may operate as a user interface "shelf" as discussed above with respect to FIG. 2D. In yet another embodiment, the user can perform a gesture such as swiping from top to bottom or tilting the top of the device toward herself to obtain information about a higher floor, or swiping from bottom to top or tilting the bottom of the device toward herself to obtain information about a lower floor.

Figure 5:
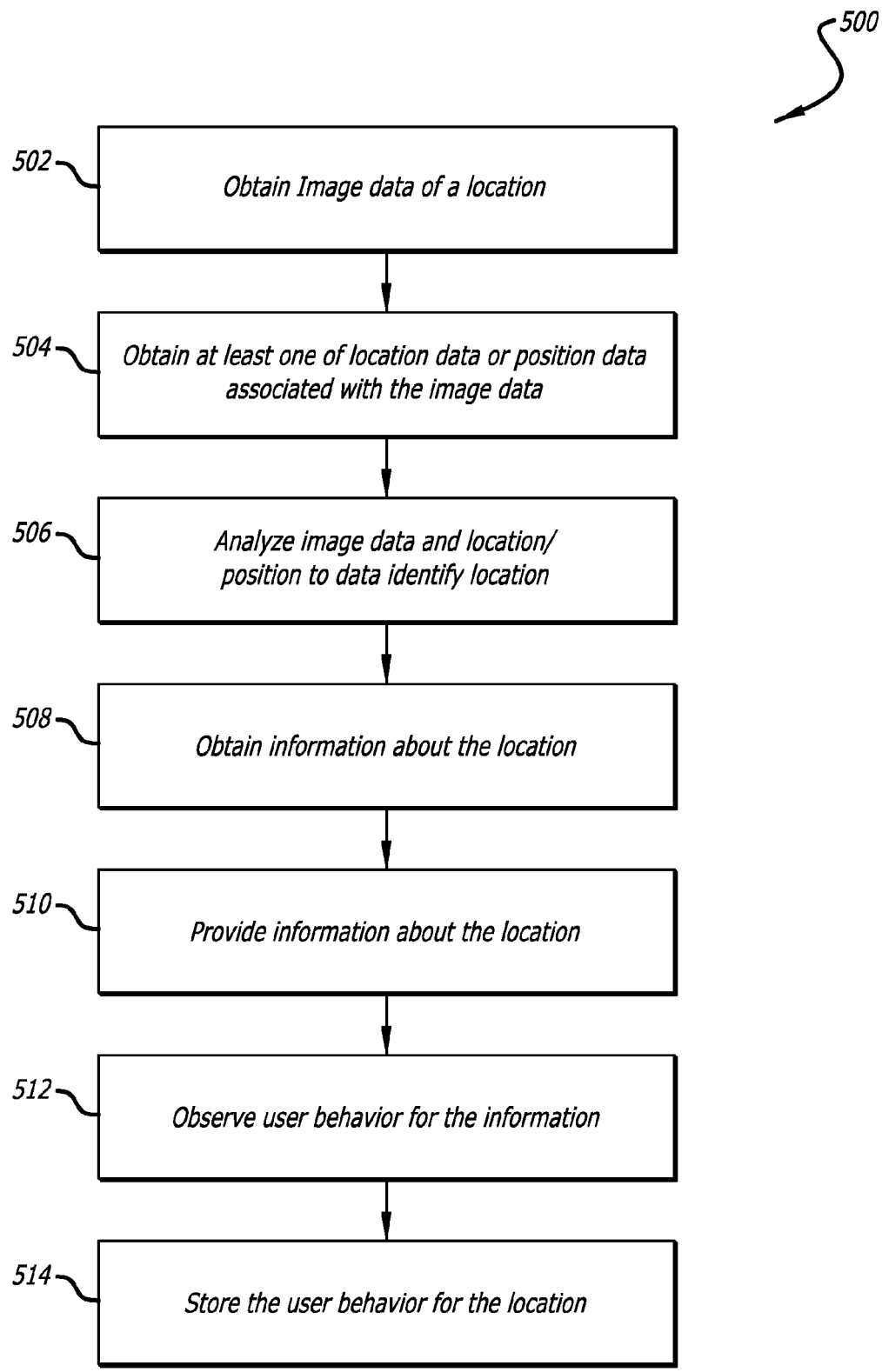
FIG. 5 illustrates an example process for information aggregation for a recognized location in accordance with various embodiments

FIG. 5 illustrates an example process 500 for aggregating information for recognized locations that can be used in accordance with various embodiments. It should be understood that, for any process discussed herein, there can be additional, fewer, or alternative steps performed in similar or alternative orders, or in parallel, within the scope of the various embodiments unless otherwise stated. In this example, the process is initiated in response to an appropriate action, such as a user opening an application or selecting an applicable option of a camera of a computing device, a user depressing a button on the computing device, performing a user gesture or providing other such input. In another embodiment, the process might be activated by voice command. Upon initiation of the application, the user or the computing device may obtain image data including at least a portion of a location 502 using the camera or other image capturing component of the computing device. In addition to capturing image data, the computing device may also concurrently obtain other sensor data associated with the image data 504, such as geolocation data from a GPS, a cellular phone network, a Wi-Fi network, a NFC or other RFID positioning system; position and/or orientation data from a digital compass, accelerometer, gyroscope, magnetometer, or other inertial sensor; vertical positioning data from an altimeter or barometer; and other such devices. In various embodiments, the computing device may perform at least some image processing, such as extracting features and/or defining feature descriptors, and the results of such processing may be provided to a remote server in an environment such as one described with respect to FIG. 8. In other embodiments, all image processing may occur at the remote server. In some embodiments, image analysis may also include an OCR process for recognizing text that may be contained in the acquired image data.

The acquired image data, which may comprise feature descriptors and/or recognized text, and sensor data may be submitted to the remote server to determine a location associated with the aggregated data 506. As discussed above, various types of image data and/or sensor data may be used to narrow the scope of the search. Text data obtained from the OCR process can be used as search query terms for a relevance search to limit the query image search, geolocation data can also be used to filter the query image search, and other sensor data such as a digital compass directional reading can be used to verify search results. Once at least one location has been determined, information regarding the recognized location can be retrieved 508, and presented to the user 510. In at least some embodiments, user preferences and historical user behavior data can also be retrieved to determine the informational content, informational sources, and/or the display format to be presented to the user.

After the information about the recognized location is displayed to the user, user interaction with respect to the displayed information can be observed 512. For example, the information may comprise several informational elements that are selectable or interactive. Informational elements may include phone numbers that may be selected to place a phone call, and website URLs that may be selected to launch a browser application that navigates to the selected website URL. Other informational elements may constitute summaries or excerpts of larger bodies of content, and may include links to view the entire content. Still other informational elements may include videos that can be played on the computing device. Selection by the user of such selectable or interactive elements can be stored for a recognized location 514. In other embodiments, less explicit user interaction can also be monitored and tracked. For example, a user gesture to zoom into a particular informational element can also be observed and stored. As another example, gaze detection can be used to determine whether the user is reviewing a specific informational element and the amount of time the user has spent looking at that informational element. When the user has been determined to have reviewed an informational element for a threshold duration of time, such user behavior can also be stored. Observed and stored user behavior data may provide an indication that the process has correctly determined a location. In addition, the user behavior data may also indicate that the information presented to the user was determined to be useful for the user. The user behavior can be aggregated and analyzed to improve the type of information presented to the user or other users having similar demographic traits to the user.

Figure 6:
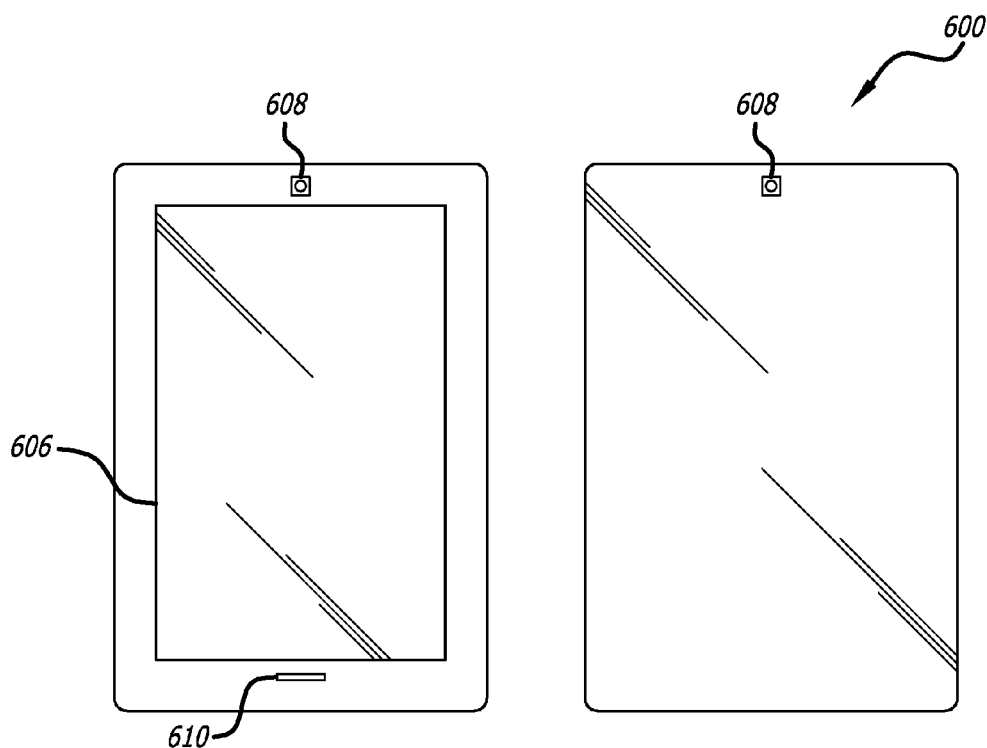
FIG. 6 illustrates an example of a computing device that can be used in accordance with various embodiments.
Figure 7:
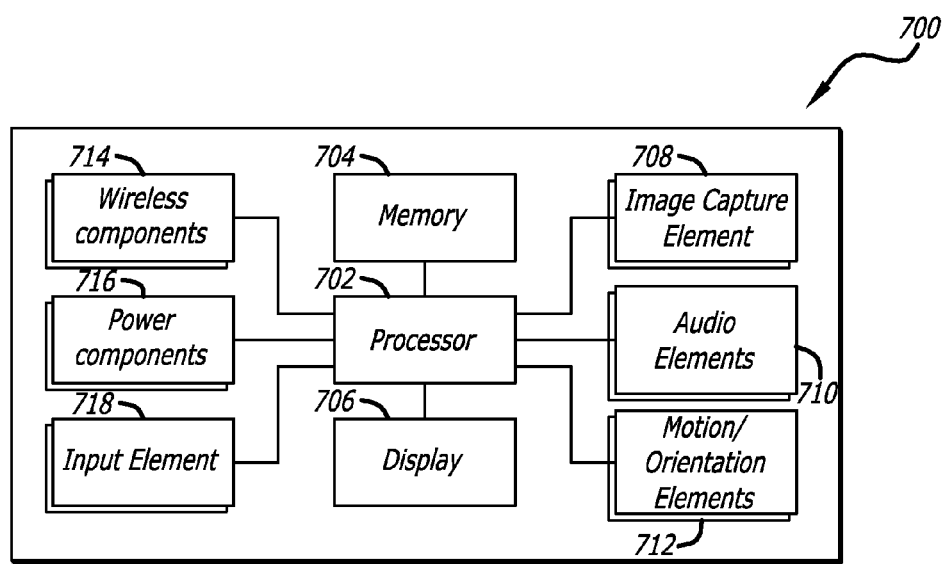
FIG. 7 illustrates an example configuration of components of a computing device such as that illustrated in FIG. 6.

FIG. 6 illustrates an example computing device 600 that can be used to perform approaches described in accordance with various embodiments. In this example, the device has a conventional image capturing component 606 on each of a same and opposite side of the device as a display element 608, and enabling the device to capture images in accordance with various embodiments. The computing device one or more audio input elements 610, such as a microphone, to receive audio input from a user. In order to provide various functionality described herein, FIG. 7 illustrates an example set of basic components of a computing device 600, such as the device 600 described with respect to FIG. 6. In this example, the device includes at least one central processor 702 for executing instructions that can be stored in at least one memory device or element 704. As would be apparent to one of ordinary skill in the art, the device can include many types of memory, data storage or computer-readable storage media, such as a first data storage for program instructions for execution by the processor 702, the same or separate storage can be used for images or data, a removable storage memory can be available for sharing information with other devices, etc.

The device typically will include some type of display element 706, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology. As discussed above, the device in many embodiments will include one or more image capture elements 708, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device. An image capture element can include, or be based at least in part upon any appropriate technology, such as a CCD or CMOS image capture element having a sufficient resolution, focal range, viewable area, to capture an image.

The device, in many embodiments, will include at least one audio element 710, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one or more motion and/or orientation elements 712 that provide information such as a position, direction, motion, or orientation of the device. These one or more motion and/or orientation determining elements 712 can include, for example, accelerometers, inertial sensors, electronic gyroscopes, electronic compasses, and GPS elements.

The example device can also include one or more additional input devices 718 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

The example device also includes one or more wireless components 714 operable to communicate with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 716 known in the art for providing power to a portable computing device, which can include capacitive charging elements for use with a power pad or similar device as discussed elsewhere herein. The example device also can include at least one touch and/or pressure sensitive element 718, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 8:
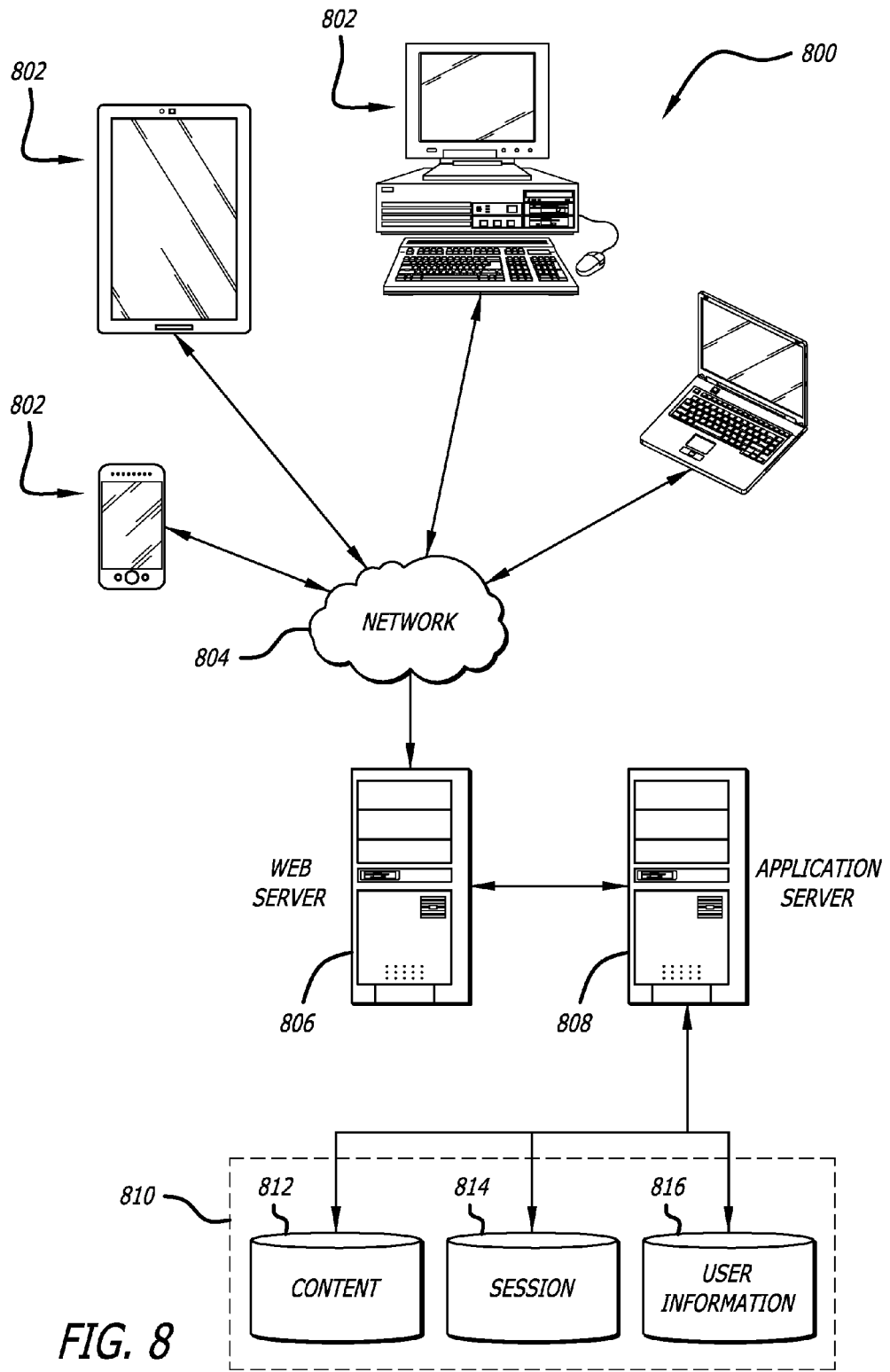
FIG. 8 illustrates an example environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for aggregating information for recognized locations, comprising:
  obtaining image data of at least a portion of at least one location using an image capturing component of a computing device;

obtaining at least one of location data or position data associated with the image data using one or more sensors of the computing device;

analyzing the image data and the at least one of location data or position data to identify the at least one location;

obtaining information about the at least one location comprising at least one first component;

determining the at least one first component of the information based at least in part on historical behavior data of a user of the computing device, the historical behavior data of the user including past location data and past position data of the user;

providing for display the information about the at least one location on a display component of the computing device;

tracking user interaction with respect to at least one second component of the information, the user interaction including communication with the computing device;

identifying at least one community of users associated with the user based on at least one demographic trait of the user;

obtaining community interaction data with respect to the at least one second component of the information, the community interaction data including communication with the computing device by a plurality of users sharing the at least one demographic trait; and adjusting a likelihood that the at least one second component will be provided for future display for the at least one location for the user based at least in part upon the community interaction data, the user interaction or the historical behavior data.

2. The computer-implemented method of claim 1, further comprising:

obtaining historical user interaction data associated with the at least one location to provide the at least one first component of the information customized for the user.

3. The computer-implemented method of claim 1, wherein the image data includes multiple locations, the method further comprising:

identifying a single location from the image data, wherein the at least one location consists of the single location.

4. A computer-implemented method for aggregating information for recognized locations, comprising:

obtaining image data of at least a portion of at least one location;

identifying the at least one location based at least in part upon the image data;

obtaining information about the at least one location comprising at least one first component;

determining the at least one first component of the information based at least in part on historical behavior data of a user of a computing device, the historical behavior data of the user including past location data and past position data of the user;

providing for display the information about the at least one location;

tracking user behavior with respect to at least one second component of the information, the user behavior including communication with the computing device;

identifying at least one community of users associated with the user based on at least one demographic trait of the user;

obtaining community interaction data with respect to the at least one second component of the information, the community interaction data including communication with the computing device by a plurality of users sharing the at least one demographic trait; and adjusting a likelihood that the at least one second component will be provided for future display for the at least one location based at least in part upon the community interaction data, the user behavior or the historical behavior data.

5. The computer-implemented method of claim 4, wherein:

tracking the user behavior includes obtaining user feedback for the at least one second component of the information; and adjusting the likelihood that the at least one second component will be provided for future display is based at least in part upon the user feedback.

6. The computer-implemented method of claim 4, wherein:

tracking the user behavior includes detecting time of user gaze with respect to the at least one second component of the information for a threshold duration of time; and adjusting the likelihood that the at least one second component will be provided for future display is based at least in part upon the time of user gaze meeting the threshold duration of time.

7. The computer-implemented method of claim 4, further comprising:

extracting textual data from the image data using an optical character recognition (OCR) process, wherein identifying the at least one location is further based at least in part upon the textual data.

8. The computer-implemented method of claim 4, further comprising:

obtaining at least one of location data or position data associated with the image data, wherein identifying the at least one location is further based at least in part upon the at least one of location data or position data associated with the image data.

9. The computer-implemented method of claim 4, wherein the image data includes multiple locations, the method further comprising:

identifying a single location from the image data, wherein the at least one location consists of the single location.

10. A computer-implemented method for aggregating information for recognized locations, comprising:

receiving a request for information regarding at least one location based at least in part upon image data of at least a portion of the at least one location;

analyzing the image data to identify the at least one location;

obtaining historical user behavior data associated with the at least one location;

obtaining the information regarding the at least one location based at least in part upon the historical user behavior data, the historical user behavior data comprising at least one first component of the information and including past location data and past position data of the user;

providing the information regarding the at least one location in response to the request;

obtaining user behavior data associated with at least one second component of the information regarding the at least one location, the user behavior data including communication with a computing device;

identifying at least one community of users associated with the user based on at least one demographic trait of the user;

obtaining community interaction data with respect to the at least one second component of the information, the community interaction data including communication with the computing device by a plurality of users sharing the at least one demographic trait;

adjusting a likelihood that the at least one second component will be provided for future display for the at least one location for the user based at least in part upon at least one of the community interaction data, a user behavior or the historical user behavior data; and storing the user behavior data as part of the historical user behavior data.

11. The computer-implemented method of claim 10, wherein analyzing the image data to identify the at least one location includes:

extracting textual data from the image data using an optical character recognition (OCR) process;

executing a search query using at least a portion of the textual data as one or more search terms;

receiving a set of images in response to the search query; and performing image matching between the image data and the set of images.

12. The computer-implemented method of claim 10, further comprising:

receiving geolocation data associated with the image data, wherein analyzing the image data to identify the at least one location includes filtering a set of images used for image matching of the image data based at least in part upon the geolocation data.

13. The computer-implemented method of claim 10, further comprising:

obtaining at least one user preference associated with presentation of the information regarding the at least one location, wherein obtaining the information regarding the at least one location is further based at least in part upon the at least one user preference.

14. The computer-implemented method of claim 10, further comprising:

obtaining a contact list of a user; and identifying an address associated with each contact of the contact list, wherein providing the information regarding the at least one location includes providing second information of each contact associated with the address corresponding to the at least one location.

15. The computer-implemented method of claim 10, further comprising:

obtaining an appointment calendar of a user; and identifying an address associated with each appointment of the appointment calendar, wherein providing the information regarding the at least one location includes providing second information of each appointment associated with the address corresponding to the at least one location.

16. The computer-implemented method of claim 10, wherein the image data includes multiple locations, the method further comprising:

identifying a single location from the image data, wherein the at least one location consists of the single location.

17. A computing device for aggregating information for recognized locations, comprising:

at least one processor;

a touch display component;

an image capturing component;

a memory device including instructions that, when executed by the at least one processor, cause the computing device to:

obtain image data of at least a portion of at least one location using the image capturing component;

identify the at least one location based at least in part upon the image data;

obtain information about the at least one location comprising at least one first component;

determine the at least one first component of the information based at least in part on historical user behavior data of a user of the computing device, the historical behavior data of the user including past location data and past position data of the user;

provide for display the information about the at least one location on the touch display component;

track user behavior with respect to at least one component of the information, the user behavior including communication with the computing device;

identify at least one community of users associated with the user based on at least one demographic trait of the user;

obtain community interaction data with respect to the at least one second component of the information, the community interaction data including communication with the computing device by a plurality of users sharing the at least one demographic trait; and adjust a likelihood that the at least one component will be provided for future display for the at least one location based at least in part upon the community interaction data, the user behavior or the historical behavior data.

18. The computing device of claim 17, wherein the instructions to obtain the information about the at least one location includes instructions when executed to cause the at least one processor to:

obtain historical user behavior data associated with the at least one location, provide at least one second component of the information that is customized for a user based at least in part upon the historical user behavior data.

19. The computing device of claim 17, further comprising:

one or more sensors for determining at least one of location data or position data, wherein the instructions when executed further cause the at least one processor to obtain the at least one of location data or position data concurrently with the image data using the one or more sensors, and wherein the instructions when executed to cause the at least one processor to obtain the information about the at least one location is further based at least in part upon the at least one of location data or position data obtained concurrently with the image data.

20. A non-transitory computer-readable storage medium storing instructions for aggregating information for recognized locations, the instructions when executed by a processor causing the processor to:

receive a request for information regarding at least one location based upon image data of at least a portion of the at least one location;

analyze the image data to identify the at least one location;

obtain historical user behavior data associated with the at least one location;

obtain the information regarding the at least one location based at least in part upon the historical user behavior data, the historical user behavior data comprising at least one first component of the information and including past location data and past position data of the user;

provide the information regarding the at least one location in response to the request;

obtain user behavior data associated with at least one second component of the information regarding the at least one location, the user behavior data including communication with a computing device;

identify at least one community of users associated with the user based on at least one demographic trait of the user;

obtain community interaction data with respect to the at least one second component of the information, the community interaction data including communication with the computing device by a plurality of users sharing the at least one demographic trait;

adjust a likelihood that the at least one second component will be provided for future display for the at least one location for the user based at least in part upon one of the community interaction data, the user behavior data, or the historical behavior data; and store the user behavior data as part of the historical user behavior data.

21. The non-transitory computer-readable storage medium of claim 20, wherein the instructions when executed further cause the processor to:

receive user behavior data associated with the information regarding the at least one location; and store the user behavior data as part of the historical user behavior data.

22. The non-transitory computer-readable storage medium of claim 20, wherein the instructions to analyze the image data to identify the at least one location includes instructions when executed to cause the processor to:

extract textual data from the image data using an optical character recognition (OCR) process;

execute a search query using at least a portion of the textual data as one or more search terms;

receive a set of images in response to the search query; and perform image matching between the image data and the set of images.

23. The non-transitory computer-readable storage medium of claim 20, wherein the instructions when executed further cause the processor to:

receive geolocation data associated with the image data, wherein the instructions to analyze the image data to identify the at least one location includes instructions to cause the processor to filter a set of images used for image matching of the image data based at least in part upon the geolocation data.

* * * * *